US012406791B2

(12) United States Patent
Yoshioka et al.

(10) Patent No.: US 12,406,791 B2
(45) Date of Patent: Sep. 2, 2025

(54) INDUCTOR COMPONENT

(71) Applicant: Murata Manufacturing Co., Ltd., Kyoto-fu (JP)

(72) Inventors: Yoshimasa Yoshioka, Nagaokakyo (JP); Hiroki Imaeda, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 932 days.

(21) Appl. No.: 17/174,202

(22) Filed: Feb. 11, 2021

(65) Prior Publication Data

US 2021/0265094 A1 Aug. 26, 2021

(30) Foreign Application Priority Data

Feb. 26, 2020 (JP) ................................ 2020-030656

(51) Int. Cl.

*H01F 17/00* (2006.01)
*H01F 17/04* (2006.01)
*H01F 27/28* (2006.01)
*H01F 27/29* (2006.01)
*H01F 27/32* (2006.01)
*H01F 41/04* (2006.01)

(52) U.S. Cl.

CPC ......... *H01F 17/0013* (2013.01); *H01F 17/04* (2013.01); *H01F 27/2823* (2013.01); *H01F 27/292* (2013.01); *H01F 27/324* (2013.01); *H01F 41/041* (2013.01); *H01F 2017/0066* (2013.01); *H01F 2017/048* (2013.01)

(58) Field of Classification Search

CPC .... H01F 17/0013; H01F 27/324; H01F 17/04; H01F 2017/048; H01F 2017/0066

USPC ........................................................ 336/200

See application file for complete search history.

(56) References Cited

U.S. PATENT DOCUMENTS 5,059,278 A * 10/1991 Cohen ...................... C23F 1/44 216/22
6,433,960 B2 * 8/2002 Sasaki ................. G11B 5/3163 360/123.56
6,621,660 B2 * 9/2003 Hsiao .................... G11B 5/313 360/123.28

(Continued)

FOREIGN PATENT DOCUMENTS

CN 1584990 A * 2/2005 ............ G11B 5/127
CN 104021913 A 9/2014

(Continued)

*Primary Examiner* — Shawki S Ismail

(74) *Attorney, Agent, or Firm* — Studebaker Brackett PLLC

(57) ABSTRACT

The inductor component includes a first magnetic layer, an inductor wiring line laminated on a main face of the first magnetic layer, a second magnetic layer disposed in the same layer as the inductor wiring line, a third magnetic layer disposed on a main face of the inductor wiring line and the second magnetic layer on a side opposite to the first magnetic layer, and an insulation layer being a non-magnetic material in contact with part of a surface of the inductor wiring line. The entire face of the surface of the inductor wiring line on the first magnetic layer side is in contact with the first magnetic layer, and a face of the surface of the inductor wiring line on the second magnetic layer side is in contact with the insulation layer.

22 Claims, 17 Drawing Sheets

(56) References Cited

U.S. PATENT DOCUMENTS

| | | | | |
|---|---|---|---|---|
| 8,004,382 | B2 * | 8/2011 | Mashino | H01F 41/046<br>336/200 |
| 8,988,181 | B2 * | 3/2015 | Chang | H01F 17/0013<br>336/200 |
| 9,336,938 | B2 * | 5/2016 | Fujii | H01F 41/041 |
| 2006/0001520 | A1 * | 1/2006 | Kaji | H01F 17/0006<br>257/E21.022 |
| 2006/0082929 | A1 * | 4/2006 | Kiyono | G11B 5/4826 |
| 2007/0285836 | A1 * | 12/2007 | Ono | G11B 5/3163<br>360/125.08 |
| 2008/0030905 | A1 * | 2/2008 | Yamanaka | G11B 5/314 |
| 2008/0068762 | A1 * | 3/2008 | Kobayashi | G11B 5/3133<br>360/314 |
| 2012/0326827 | A1 * | 12/2012 | Nanjyo | H01F 17/0033<br>336/200 |
| 2014/0225701 | A1 * | 8/2014 | Morita | H01F 17/0013<br>336/200 |
| 2017/0213639 | A1 * | 7/2017 | Kudo | H01F 27/366 |
| 2018/0310408 | A1 * | 10/2018 | Hamada | H02M 3/003 |
| 2020/0098506 | A1 * | 3/2020 | Hamada | H01F 27/32 |

FOREIGN PATENT DOCUMENTS

| | | | | | |
|---|---|---|---|---|---|
| CN | 109671551 | A | | 4/2019 | |
| JP | 2005285790 | A | * | 10/2005 | G03F 7/70758 |
| JP | 2013-225718 | A | | 10/2013 | |
| JP | 2014-170773 | A | | 9/2014 | |
| JP | 2019-062071 | A | | 4/2019 | |
| JP | 2019-075478 | A | | 5/2019 | |

* cited by examiner

INDUCTOR COMPONENT

CROSS-REFERENCE TO RELATED APPLICATION

This application claims benefit of priority to Japanese Patent Application No. 2020-030656, filed Feb. 26, 2020, the entire content of which is incorporated herein by reference.

BACKGROUND

Technical Field

The present disclosure relates to an inductor component.

Background Art

An inductor wiring line is laminated on a surface of an insulation substrate in an inductor component described in Japanese Unexamined Patent Application Publication No. 2013-225718. The face of the inductor wiring line not covered by the insulation substrate is covered by an insulation layer. The outer face of the laminated structure constituted of the inductor wiring line, the insulation substrate, and the insulation layer is covered by a magnetic layer.

SUMMARY

In the inductor component described in Japanese Unexamined Patent Application Publication No. 2013-225718, the proportion of the magnetic layer may be made larger as the proportion of the insulation substrate or the insulation layer is smaller when the overall volume of the inductor component is the same. This is advantageous in terms of improving the inductance. On the other hand, omitting all of the insulation substrate and the insulation layer may not ensure the demanded insulation property, and is not practical.

Accordingly, one aspect of the present disclosure is an inductor component including a first magnetic layer; an inductor wiring line laminated on a main face of the first magnetic layer; a second magnetic layer disposed in a layer same as the inductor wiring line; a third magnetic layer disposed on a main face of the inductor wiring line and the second magnetic layer on a side opposite to the first magnetic layer; and an insulation layer being a non-magnetic material in contact with part of a surface of the inductor wiring line, in which an entire face of the surface of the inductor wiring line on a side of the first magnetic layer is in contact with the first magnetic layer, and a face of the surface of the inductor wiring line on the second magnetic layer side is in contact with the insulation layer.

According to the configuration described above, the entire face of the surface of the inductor wiring line on the first magnetic layer side is in contact with the first magnetic layer without the insulation layer interposed therebetween. Absence of the insulation layer on the first magnetic layer side relative to the inductor wiring line allows the proportion of the insulation layer in the inductor component to be relatively small. Further, interposing the insulation layer in the same layer as the inductor wiring line makes it easy to ensure the insulation property in the same layer with the inductor wiring line. Note that the surface of the inductor wiring line refers to an outer face being a boundary with the outer side portion of the inductor wiring line.

Other features, elements, characteristics and advantages of the present disclosure will become more apparent from the following detailed description of preferred embodiments of the present disclosure with reference to the attached drawings.

DETAILED DESCRIPTION

Hereinafter, an inductor component and an embodiment of the inductor component will be described. Note that constituent elements may be illustrated in an enlarged manner in order to facilitate understanding of the drawings. The dimensional ratio of the constituent element may differ from the actual dimensional ratio or that in another drawing.

First Embodiment

Hereinafter, a first embodiment of the inductor component will be described.

Figure 1:
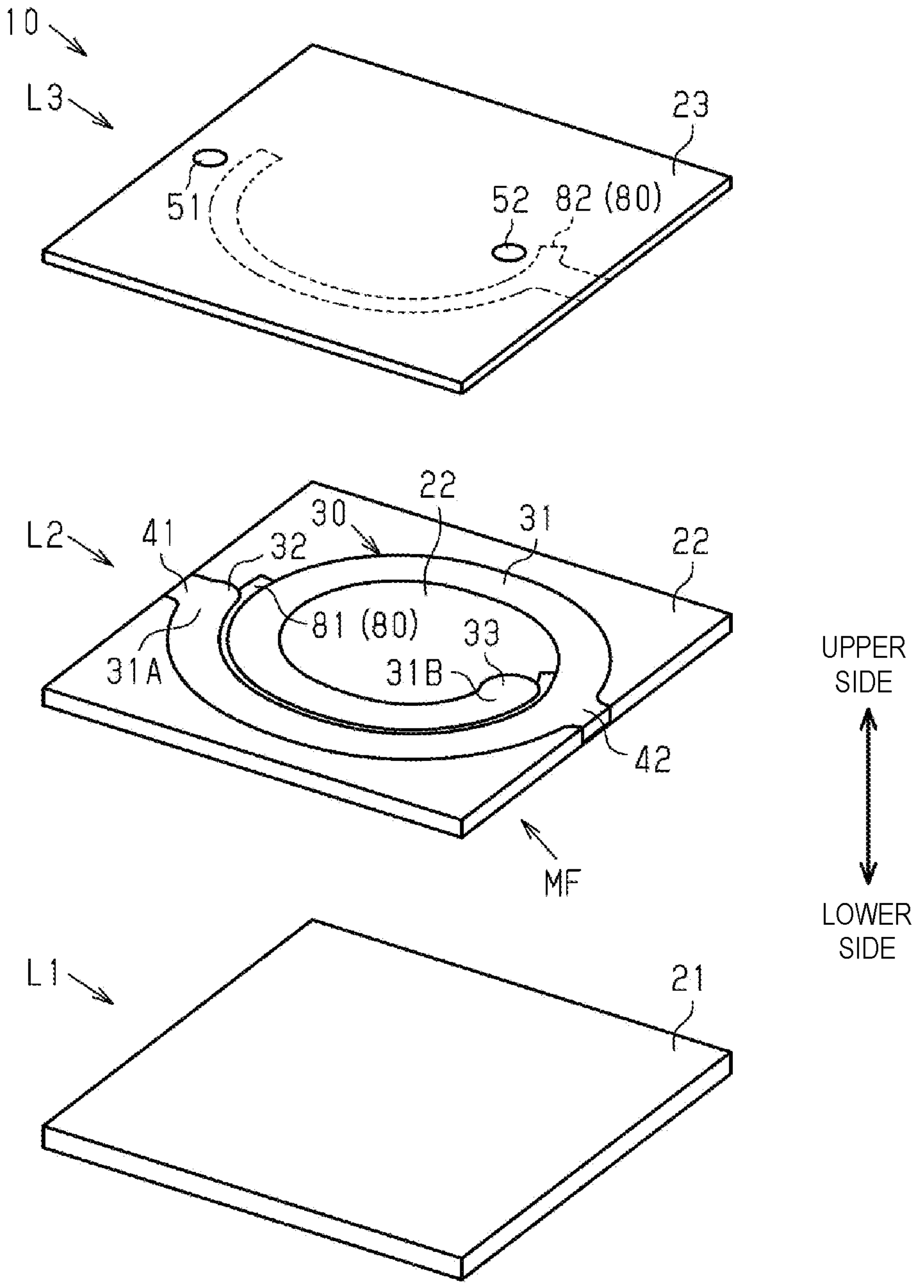
FIG. 1 is an exploded perspective view of an inductor component in a first embodiment.

An inductor component 10 has, as a whole, a structure in which three thin plate-shape layers are laminated in a thickness direction as illustrated in FIG. 1. In the following description, a lamination direction of each of three layers will be described as an up-down direction.

Figure 4:
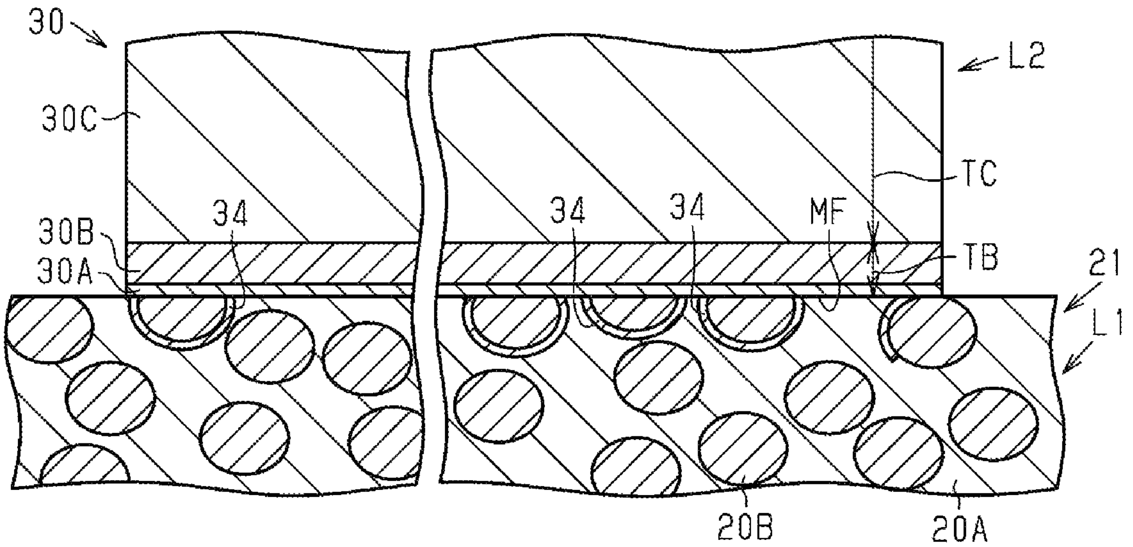
FIG. 4 is an enlarged sectional view of a contacting portion between an inductor wiring line and a magnetic layer in the first embodiment.

A first layer L1 has a substantially square shape when viewed in the up-down direction. The first layer L1 is constituted of only a first magnetic layer 21. The first magnetic layer 21 is a mixture of a resin and a magnetic metal powder, and is a magnetic body as a whole. Magnetic metal powders 20B are dispersed in a base material 20A made of an insulation material in the first magnetic layer 21 as illustrated in FIG. 4. The first magnetic layer 21, therefore, is a magnetic material as a whole. The base material 20A is composed of an epoxy-based resin and an inorganic filler having an average particle size equal to or less than about 1.0 μm. Further, the magnetic metal powder 20B is an alloy made of iron, silicon, and chromium, and the average particle size of the magnetic metal powder 20B is equal to or less than about 5.0 μm. In the present embodiment, the first layer L1 is the lowermost layer in the up-down direction. That is, in the up-down direction, the side on which an outer electrode 70 is provided is referred to as an upper side, and the opposite side thereof is referred to as a lower side. The outer electrode 70 will be described later.

A second layer L2 having the substantially square shape same as the first layer L1 when viewed in the up-down direction is laminated on the upper side face of the first layer L1 in the lamination direction as illustrated in FIG. 1. In the embodiment, the face of the second layer L2 contacting with the first layer L1 is a main face MF of the second layer L2. The second layer L2 is constituted of an inductor wiring line 30, a first dummy wiring line 41, a second dummy wiring line 42, a second magnetic layer 22, and a first insulation portion 81. That is, the inductor wiring line 30 constituting part of the second layer L2 is laminated on a main face of the first magnetic layer 21 constituting the first layer L1.

Figure 2:
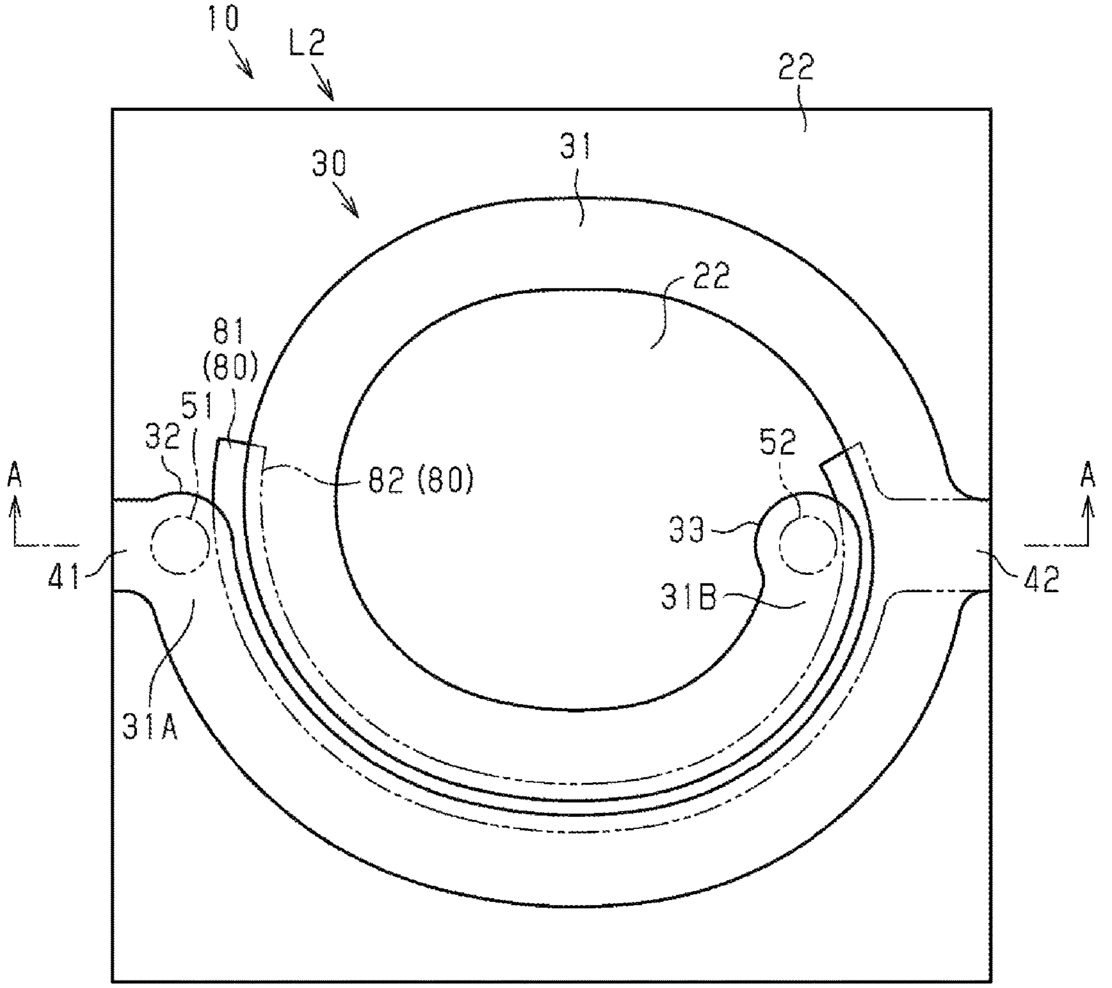
FIG. 2 is a top view of a second layer in the first embodiment.

The inductor wiring line 30 is constituted of a wiring line main body 31, a first pad 32, and a second pad 33 in the second layer L2 as illustrated in FIG. 2. The inductor wiring line 30 extends in a spiral shape around the center of a substantially square shape in the second layer L2 when viewed from the upper side in the up-down direction. Specifically, when viewed from the upper side in the up-down direction, the wiring line main body 31 of the inductor wiring line 30 is spirally wound in a counterclockwise direction from an outer peripheral end portion 31A in the outer side portion in a radial direction toward an inner peripheral end portion 31B in the inner side portion in the radial direction.

The number of turns of the inductor wiring line 30 is determined based on a virtual vector. The starting point of the virtual vector is placed on a virtual center line extending along the extending direction of the inductor wiring line 30 through the center of the wiring line width of the inductor wiring line 30. The direction of the virtual vector rotates in a normal direction view when the starting point of the inductor wiring line 30 is moved from one end to the other end of the virtual center line. The number of turns of the inductor wiring line 30 is defined as about 1.0 turns when the direction of the virtual vector rotates about 360 degrees. Thus, when the inductor wiring line 30 is wound about 180 degrees, the number of turns is about 0.5 turns, for example. The direction of the virtual vector virtually placed on the inductor wiring line rotates about 540 degrees in the embodiment. With this, the number of turns of the wound inductor wiring line 30 is about 1.5 turns in the embodiment.

The first pad 32 is connected to the outer peripheral end portion 31A of the wiring line main body 31. The first pad 32 has a substantially circular shape when viewed in the up-down direction. The diameter of the circle of the first pad 32 is larger than the wiring line width of the wiring line main body 31.

The first dummy wiring line 41 extends from the first pad 32 toward the outer edge side of the second layer L2. The first dummy wiring line 41 extends to the side face of the second layer L2, and is exposed to the outer face of the inductor component 10.

The second pad 33 is connected to the inner peripheral end portion 31B of the wiring line main body 31. The second pad 33 has a substantially circular shape when viewed in the up-down direction. The diameter of the circle of the second pad 33 is larger than the wiring line width of the wiring line main body 31.

The second dummy wiring line 42 extends from a portion wound by 0.5 turns from the outer peripheral end portion 31A in a region between the outer peripheral end portion 31A and the inner peripheral end portion 31B of the wiring line main body 31. The second dummy wiring line 42 extends to the side face of the second layer L2, and is exposed to the outer face of the inductor component 10. The inductor wiring line 30, the first dummy wiring line 41, and the second dummy wiring line 42 are integrated with one another in the embodiment.

The inductor wiring line 30 has a laminated structure including a catalyst layer 30A, a first wiring line layer 30B, and a second wiring line layer 30C in order from the side of the first magnetic layer 21 constituting the first layer L1 as illustrated in FIG. 4. The catalyst layer 30A of the inductor wiring line 30 is in contact with the upper face of the first magnetic layer 21, and constitutes a main face MF of the second layer L2. The material of the catalyst layer 30A is palladium. Only the inductor wiring line 30 and the first magnetic layer 21 that is described above are illustrated in FIG. 4, and other constituent elements are not illustrated.

The first wiring line layer 30B is directly laminated on the upper face of the catalyst layer 30A. The material of the first wiring line layer 30B has a copper ratio equal to or less than about 99 wt % and a nickel ratio equal to or larger than about 0.1 wt %. A thickness TB of the first wiring line layer 30B is equal to or less than about one-tenth of the wiring line width of the inductor wiring line 30. The thickness TB of the first wiring line layer 30B is about 2.0 m in the embodiment. The thickness TB of the first wiring line layer 30B is determined as follows. The thickness from the upper end of the first magnetic layer 21 to the upper end of the first wiring line layer 30B is measured at three points in a cross section along the lamination direction in one observation field under a microscope of 1500 times magnification. The thickness TB of the first wiring line layer 30B is determined as the average value of the three measured values. The thickness TB of the first wiring line layer 30B is substantially constant in the embodiment. Note that the thickness of the catalyst layer 30A described above is exaggerated in FIG. 4, but is much smaller than the thickness of the first wiring line layer 30B. Thus, in measuring the thickness TB of the first wiring line layer 30B, measuring the thickness from the upper end of the first magnetic layer 21, that is, including the thickness of the catalyst layer 30A, does not affect the measurement. However, when the interface of the catalyst layer 30A is clearly confirmed, the thickness TB may be measured from the upper face of the catalyst layer 30A. The wiring line width of the inductor wiring line 30 is determined as the average value of three points of the width dimension of the inductor wiring line 30 in the vicinity of the center in the extending direction.

Figure 3:
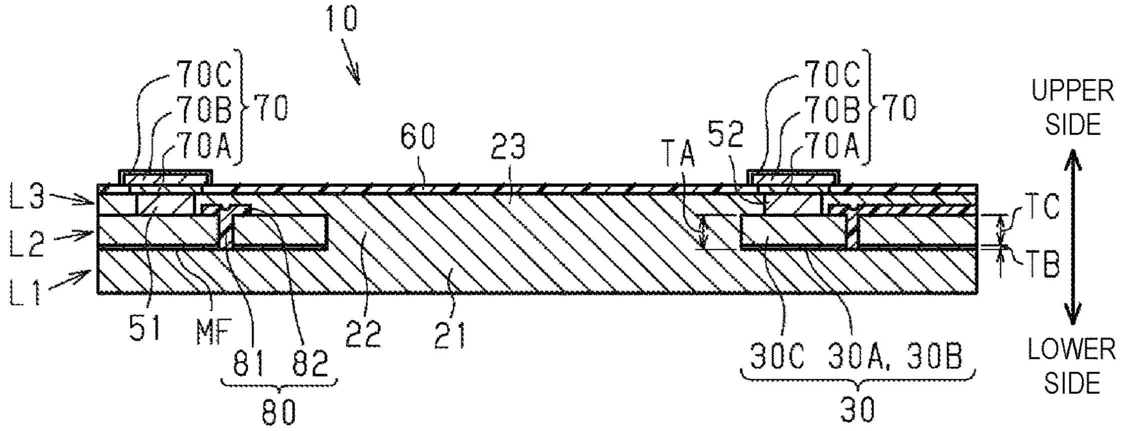
FIG. 3 is a sectional view of the inductor component in the first embodiment taken along a line A-A in FIG. 2.

The second wiring line layer 30C is directly laminated on the upper face of the first wiring line layer 30B being the surface on a third magnetic layer 23 side. A thickness TC of the second wiring line layer 30C is equal to or about five times larger than the thickness TB of the first wiring line layer 30B. The second wiring line layer 30C has the thickness TC of about 45 μm in the embodiment. An overall thickness TA of the inductor wiring line 30 is a total value of the thickness TB of the first wiring line layer 30B and the thickness TC of the second wiring line layer 30C as illustrated in FIG. 3, and is about 47 μm. The material of the second wiring line layer 30C has a copper ratio equal to or larger than about 99 wt %, and the nickel ratio is equal to or less than the detection limit.

An anchor portion 34 extends from the main face MF of the inductor wiring line 30 as illustrated in FIG. 4. The anchor portion 34 covers the surfaces of the magnetic metal powders 20B in contact with the main face MF among the large number of magnetic metal powders 20B in the first magnetic layer 21. The anchor portion 34 extends from the main face MF so as to enter a gap between the base material 20A and the magnetic metal powder 20B in the first magnetic layer 21. Further, the magnetic metal powder 20B covered by the anchor portion 34 includes a cross section in which equal to or more than about one-third of the surface is covered by the anchor portion 34 when the magnetic metal powder 20B is viewed in a cross section. The cross section is orthogonal to the main face MF in the embodiment.

In the inductor wiring line 30 of the second layer L2, a 0.5 turns portion on the first pad 32 side and a 0.5 turns portion on the second pad 33 side extend in parallel to each other as illustrated in FIG. 1. The distance between the wiring lines in the inductor wiring line 30 is minimum between the inner side face of the 0.5 turns portion in the radial direction on the first pad 32 side and the outer side face of the 0.5 turns portion in the radial direction on the second pad 33 side. Further, in the second layer L2, a first insulation portion 81 is interposed between the inner side face of the 0.5 turns portion in the radial direction on the first pad 32 side and the outer side face of the 0.5 turns portion in the radial direction on the second pad 33 side. That is, the first insulation portion 81 is interposed in the portion where the distance between the wiring lines in the inductor wiring line 30 is minimum, and extends in a substantially arc shape along the inductor wiring line 30. The first insulation portion 81 is composed of an epoxy-based resin and an inorganic filler having an average particle size equal to or less than about 1.0 μm.

In the second layer L2, the portion other than the inductor wiring line 30, the first dummy wiring line 41, the second dummy wiring line 42, and the first insulation portion 81 is the second magnetic layer 22. Accordingly, the second magnetic layer 22 is present in the central portion of the second layer L2 and in the portion of the second layer L2 on the outer side relative to the inductor wiring line 30. Therefore, a face of the surface of the inductor wiring line 30 on the side opposite to the first insulation portion 81 is in contact with the second magnetic layer 22. In addition, the material of the second magnetic layer 22 is the same as that of the first magnetic layer 21. As described above, the second magnetic layer 22 is disposed in the same layer as the inductor wiring line 30.

A third layer L3 having the substantially square shape same as the second layer L2 when viewed in the up-down direction is laminated on the upper face of the second layer L2. The third layer L3 is constituted of a first vertical wiring line 51, a second vertical wiring line 52, the third magnetic layer 23, and a second insulation portion 82. The first vertical wiring line 51 and the second vertical wiring line 52 are connected to the inductor wiring line 30, and penetrate through the third magnetic layer 23 from the main face on the inductor wiring line 30 side toward the main face on the side opposite to the inductor wiring line 30 side.

The first vertical wiring line 51 is directly connected to the upper side face of the first pad 32 without any other layers interposed therebetween. The first vertical wiring line 51 has a substantially columnar shape, and an axis line direction of the column coincides with the up-down direction. The diameter of the substantially circular first vertical wiring line 51 is smaller than the diameter of the first pad 32 when viewed in the up-down direction. The material of the first vertical wiring line 51 is the same as that of the second wiring line layer 30C of the inductor wiring line 30.

The second vertical wiring line 52 is directly connected to the upper side face of the second pad 33 without any other layers interposed therebetween. The second vertical wiring line 52 has a substantially columnar shape, and an axis line direction of the column coincides with the up-down direction. The diameter of the substantially circular second vertical wiring line 52 is smaller than the diameter of the second pad 33 when viewed in the up-down direction. The material of the second vertical wiring line 52 is the same as that of the second wiring line layer 30C of the inductor wiring line 30. Note that the second wiring line layer 30C of the inductor wiring line 30, the first dummy wiring line 41, the second dummy wiring line 42, the first vertical wiring line 51, and the second vertical wiring line 52 are integrated with one another. The first vertical wiring line 51 and the second vertical wiring line 52 are virtually illustrated by a dashed-and-double-dotted line in FIG. 2.

The second insulation portion 82 is directly connected to the upper side face of the first insulation portion 81 without any other layers interposed therebetween as illustrated in FIG. 1. The second insulation portion 82 covers a wider range than the first insulation portion 81 in the width direction orthogonal to the extending direction of the first insulation portion 81. As a result, the second insulation portion 82 covers part of the upper face of the 0.5 turns portion on the first pad 32 side and part of the upper face of the 0.5 turns portion on the second pad 33 side in the inductor wiring line 30. The thickness of the second insulation portion 82 is smaller than the thickness of the third layer L3, and the third magnetic layer 23 is laminated on the upper side of the second insulation portion 82 in the third layer L3. The second insulation portion 82 is composed of epoxy-based resin and an inorganic filler having an average particle size equal to or less than about 1.0 μm, similarly to the first insulation portion 81. Note that an insulation layer 80 is constituted of the first insulation portion 81 and the second insulation portion 82 in the embodiment. The second insulation portion 82 is virtually illustrated by a dashed-and-double-dotted line in FIG. 2.

In the third layer L3, the portion other than the second insulation portion 82, the first vertical wiring line 51, and the second vertical wiring line 52 is the third magnetic layer 23 as illustrated in FIG. 1. The third magnetic layer 23, therefore, is laminated on an upper side main face of the inductor wiring line 30 and the second magnetic layer 22 in the lamination direction on the side opposite to the first magnetic layer 21.

A covering layer 60 made of an insulation material is laminated on an upper side main face of the surface of the third layer L3 on the side opposite to the inductor wiring line 30 as illustrated in FIG. 3. The covering layer 60 covers substantially the entire area of the upper side face of the third layer L3, but holes are formed in portions corresponding to the first vertical wiring line 51 and the second vertical wiring line 52 in the third layer L3. That is, the upper side face of the first vertical wiring line 51 and the second vertical wiring line 52 on the side opposite to the inductor wiring line 30 is not covered by the covering layer 60.

An outer electrode 70 is connected to an upper side face of the first vertical wiring line 51. The outer electrode 70 seems as if it is penetrating through the covering layer 60, and the upper face of the outer electrode 70 is exposed from the covering layer 60. The outer electrode 70 has a three-layer structure, and is constituted of a copper layer 70A, a nickel layer 70B, and a gold layer 70C in order from the lower side in the lamination direction. In addition, the outer electrode 70 is also connected to the upper side face of the second vertical wiring line 52. Note that the covering layer 60 and the outer electrode 70 are not illustrated in FIG. 1.

Next, a manufacturing method of the inductor component 10 in the first embodiment will be described.

Figure 5:
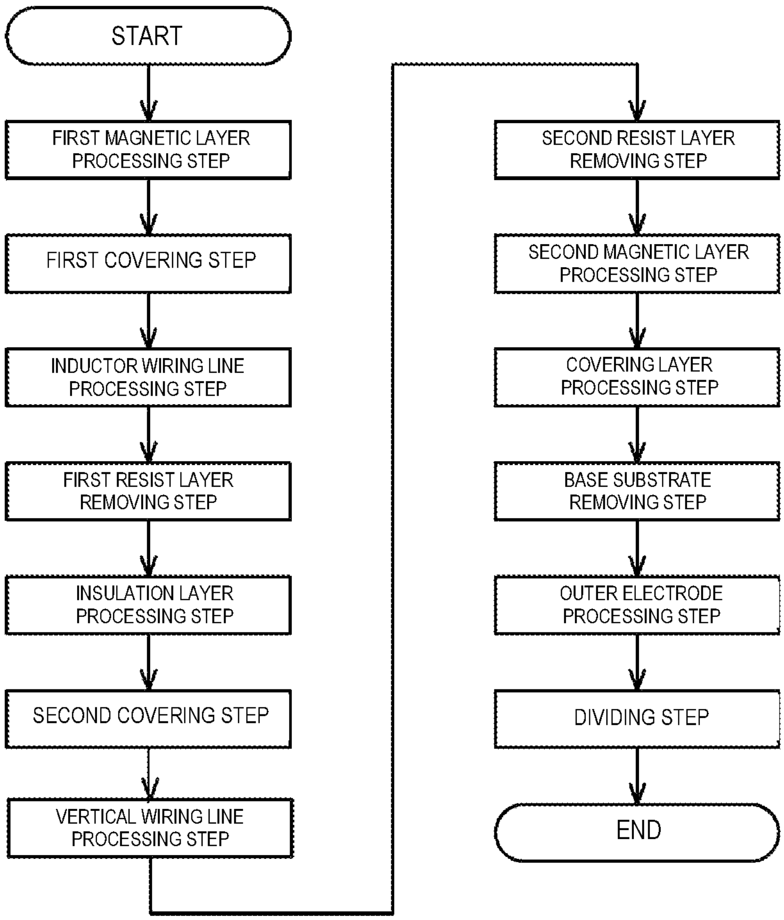
FIG. 5 is an explanatory diagram of a manufacturing method of the inductor component in the first embodiment.

The manufacturing method of the inductor component 10 includes a first magnetic layer processing step, a first covering step, an inductor wiring line processing step, a first resist layer removing step, an insulation layer processing step, a second covering step, a vertical wiring line processing step, a second resist layer removing step, a second magnetic layer processing step, a covering layer processing step, a base substrate removing step, an outer electrode processing step and a dividing step as illustrated in FIG. 5.

Figure 6:
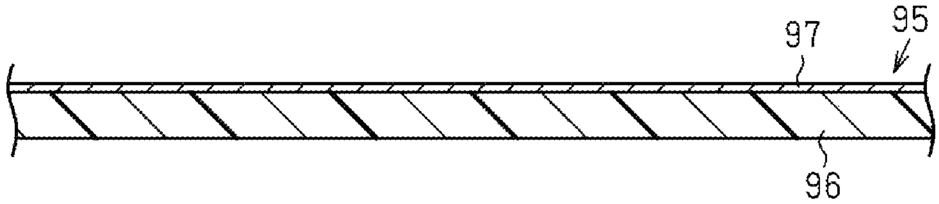
FIG. 6 is an explanatory diagram of the manufacturing method of the inductor component in the first embodiment.
Figure 7:
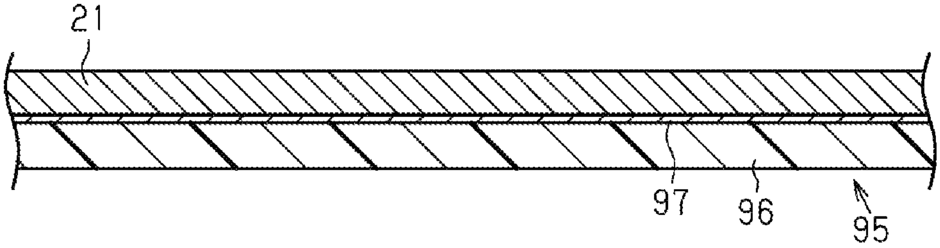
FIG. 7 is an explanatory diagram of the manufacturing method of the inductor component in the first embodiment.

In manufacturing the inductor component 10, first, the first magnetic layer processing step is performed. A base substrate with a copper foil 95 is prepared as illustrated in FIG. 6. A base substrate 96 of the base substrate with the copper foil 95 has a plate-shape. A copper foil 97 is laminated on the upper side face of the base substrate 96 in the lamination direction. Then, the first magnetic layer 21 composed of the base material 20A and the magnetic metal powder 20B is formed on the upper side face of the copper foil 97 of the base substrate with copper foil 95 as illustrated in FIG. 7. In forming the first magnetic layer 21, an insulation resin containing the magnetic metal powder 20B is applied, and the insulation resin is solidified by press working to obtain the base material 20A. The upper portions of the base material 20A and the magnetic metal powder 20B are ground such that the thickness in the up-down direction of the first magnetic layer 21 becomes a desired thickness. It is preferable to form a slight gap at the interface between the base material 20A and the magnetic metal powder 20B by controlling process parameters during the grinding. For example, vibrating the magnetic metal powder 20B exposed from the base material 20A by the grinding tool may form a slight gap between the base material 20A and the magnetic metal powder 20B. More specifically, the grinding tool is in contact with the base material 20A and the magnetic metal powder 20B to grind the upper portions of the base material 20A and the magnetic metal powder 20B, and an appropriate vibration of the grinding tool causes the vibration of the magnetic metal powder 20B to be larger because the magnetic metal powder 20B is harder than the base material 20A made of an insulation resin. As described above, a slight gap is formed by the difference in vibration between the base material 20A and the magnetic metal powder 20B.

Figure 8:
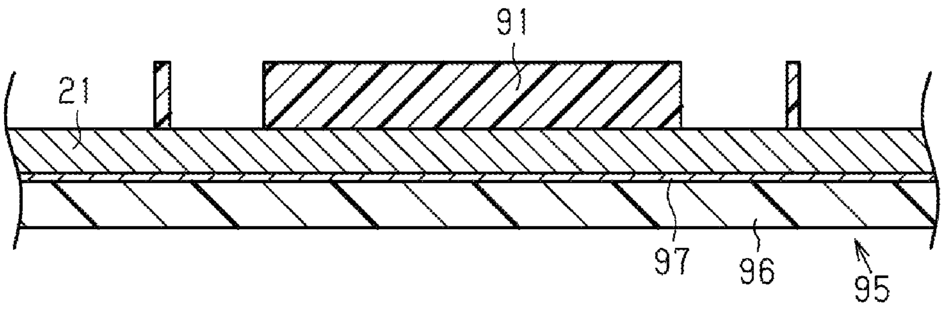
FIG. 8 is an explanatory diagram of the manufacturing method of the inductor component in the first embodiment.

The first covering step is performed next to the first magnetic layer processing step. In the first covering step, a first resist layer 91 covering the portion of the upper side face of the first magnetic layer 21, on which the inductor wiring line 30, the first dummy wiring line 41, and the second dummy wiring line 42 are not formed, is patterned by photolithography as illustrated in FIG. 8. Specifically, first, a photosensitive dry film resist is applied to the entire upper side face of the first magnetic layer 21. Next, the portion of the upper side face of the first magnetic layer 21, on which the inductor wiring line 30, the first dummy wiring line 41, and the second dummy wiring line 42 are not formed, is exposed to light. As a result, of the applied dry film resist, the portion exposed to light is cured. Thereafter, the uncured portion of the applied dry film resist is peeled and removed by a chemical solution. Thus, the cured portion of the applied dry film resist is formed as the first resist layer 91. On the other hand, the first magnetic layer 21 is exposed in the portion where the applied dry film resist is removed by a chemical solution and is not covered by the first resist layer 91.

Figure 9:
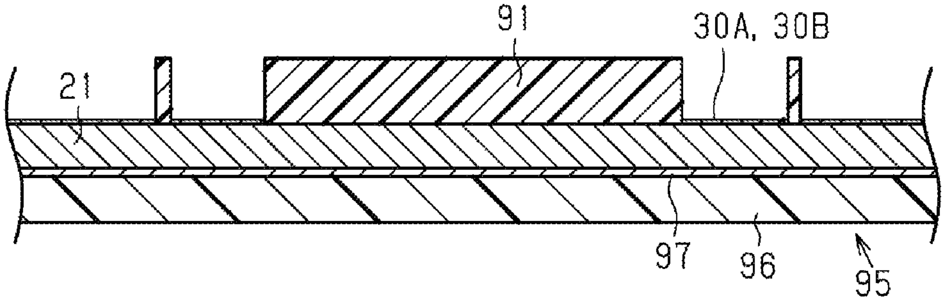
FIG. 9 is an explanatory diagram of the manufacturing method of the inductor component in the first embodiment.

An inductor wiring line processing step is performed next to the first covering step. In the inductor wiring line processing step, the inductor wiring line 30 constituted of the catalyst layer 30A, the first wiring line layer 30B, and the second wiring line layer 30C is formed on the upper side face of the first magnetic layer 21. Specifically, first, a portion which is not covered by the first resist layer 91 is made to adsorb palladium as illustrated in FIG. 9 in the upper side face of the first magnetic layer 21. With this, the palladium adsorbed on the upper side face of the first magnetic layer 21 is formed as the catalyst layer 30A. Next, the electroless copper plating by performing the immersion in an electroless copper plating solution forms the first wiring line layer 30B having a copper ratio equal to or less than about 99 wt % and a nickel ratio equal to or larger than about 0.1 wt % on the upper side face of the catalyst layer 30A. The electroless copper plating solution is an alkaline solution, and contains copper salts such as copper chloride, copper sulfate and the like. On the other hand, the material of the magnetic metal powder 20B is iron, and the ionization tendency is larger than that of copper being the material of the first wiring line layer 30B. Therefore, in the inductor wiring line processing step, iron on the surface of the magnetic metal powder 20B dissolves, and instead, copper is deposited on the surface of the magnetic metal powder 20B.

Here, since the electroless copper plating solution enters a slight gap between the base material 20A and the magnetic metal powder 20B, the substitution of iron with copper occurs not only on the exposed face side of the magnetic metal powder 20B but also on the surface of the magnetic metal powder 20B on the inner side of the base material 20A. Copper deposited on the surface of the magnetic metal powder 20B on the inner side of the base material 20A functions as the anchor portion 34.

The covering amount is controlled such that copper deposited on the surface of the magnetic metal powder 20B on the inner side of the base material 20A covers equal to or more than about one-third of the surface area of the magnetic metal powder 20B. Specifically, the covering amount is controlled by such as the application duration of a voltage for the electroless copper plating, the amount of the electric current, the content of copper or the catalyst in the plating solution or the like.

Figure 10:
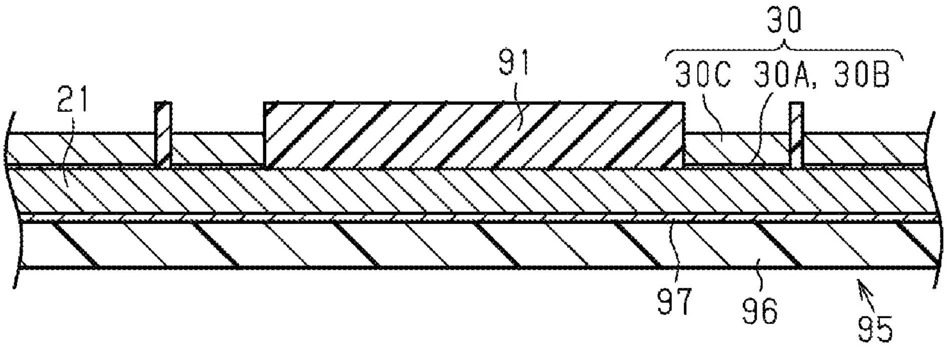
FIG. 10 is an explanatory diagram of the manufacturing method of the inductor component in the first embodiment.

An electrolytic copper plating is performed next to the electroless copper plating as illustrated in FIG. 10. With this, the second wiring line layer 30C having a copper ratio equal to or larger than about 99 wt % is formed on the surface of the first wiring line layer 30B. As described above, the inductor wiring line 30 is formed by the adsorption of palladium, the electroless copper plating, and the electrolytic copper plating.

Figure 11:
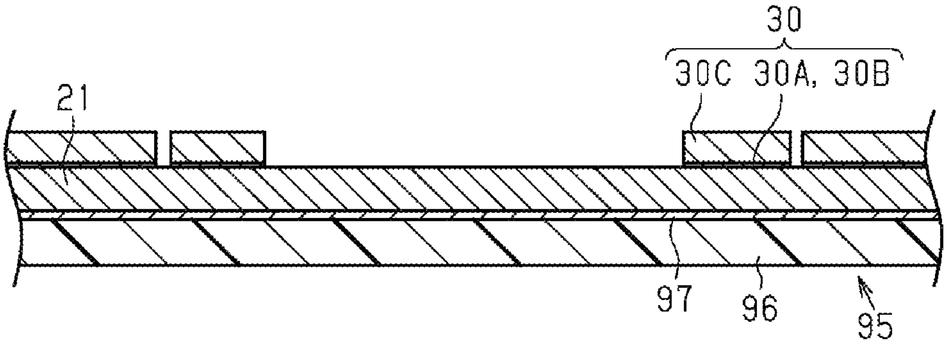
FIG. 11 is an explanatory diagram of the manufacturing method of the inductor component in the first embodiment.

The first resist layer removing step for removing the first resist layer 91 is performed next to the inductor wiring line processing step. In the first resist layer removing step, the first resist layer 91 is peeled off to remove from the first magnetic layer 21 as illustrated in FIG. 11.

Figure 12:
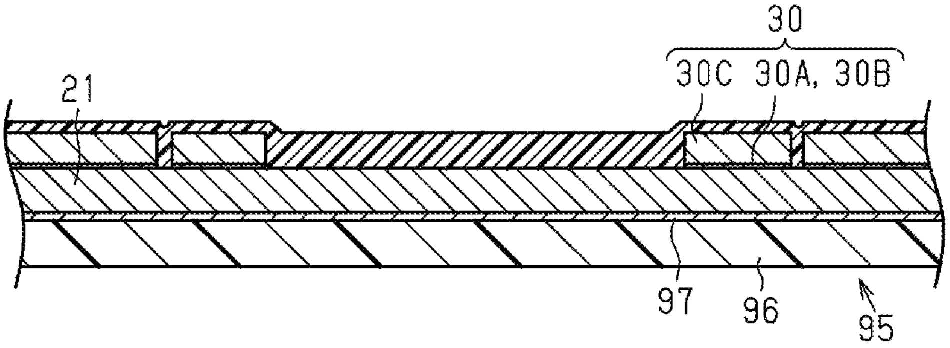
FIG. 12 is an explanatory diagram of the manufacturing method of the inductor component in the first embodiment.
Figure 13:
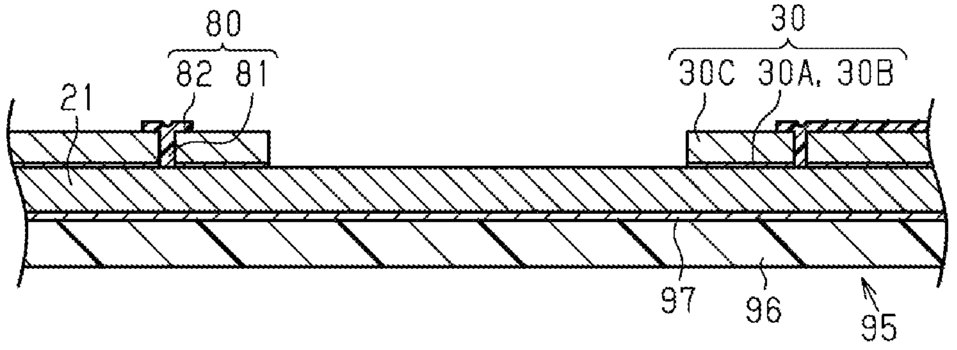
FIG. 13 is an explanatory diagram of the manufacturing method of the inductor component in the first embodiment.

The insulation layer processing step is performed next to the first resist layer removing step. In the insulation layer processing step, first, the insulation resin is applied to the upper side faces of the first magnetic layer 21, the inductor wiring line 30, the first dummy wiring line 41, and the second dummy wiring line 42 as illustrated in FIG. 12. Next, a portion for forming the first insulation portion 81 and the second insulation portion 82 is exposed to light as illustrated in FIG. 13. As a result, the portion exposed to light is cured. Thereafter, the uncured portion of the insulation resin is peeled and removed by a chemical solution. Thus, the cured portion of the applied insulation resin is formed as the insulation layer 80.

Figure 14:
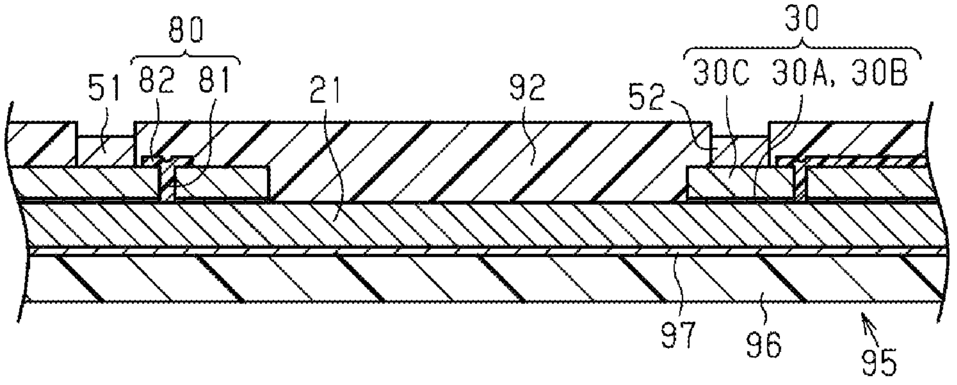
FIG. 14 is an explanatory diagram of the manufacturing method of the inductor component in the first embodiment.

The second covering step is performed next to the insulation layer processing step. In the second covering step, patterned is a second resist layer 92 covering a portion of the upper side face of the first magnetic layer 21 and the upper side face of the second wiring line layer 30C, on which the first vertical wiring line 51 and the second vertical wiring line 52 are not formed as illustrated in FIG. 14. Note that the aspect of the photolithography in the second covering step is the same as that in the first covering step and a detailed description thereof will be omitted.

The vertical wiring line processing step for forming the first vertical wiring line 51 and the second vertical wiring line 52 is performed next to the second covering step. In the vertical wiring line processing step, electrolytic copper plating is performed, and the first vertical wiring line 51 and the second vertical wiring line 52 are formed in a portion which is not covered by the second resist layer 92 of the upper side face of the second wiring line layer 30C. The first vertical wiring line 51 and the second vertical wiring line 52 have the copper ratio equal to or larger than about 99 wt %.

Figure 15:
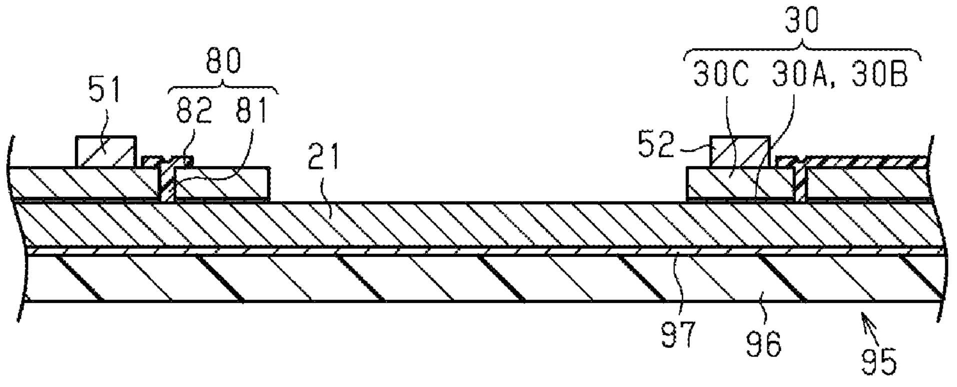
FIG. 15 is an explanatory diagram of the manufacturing method of the inductor component in the first embodiment.

The second resist layer removing step for removing the second resist layer 92 is performed next to the vertical wiring line processing step as illustrated in FIG. 15. In the second resist layer removing step, the second resist layer 92 is peeled off to remove from the first magnetic layer 21 similarly to the first resist layer removing step.

Figure 16:
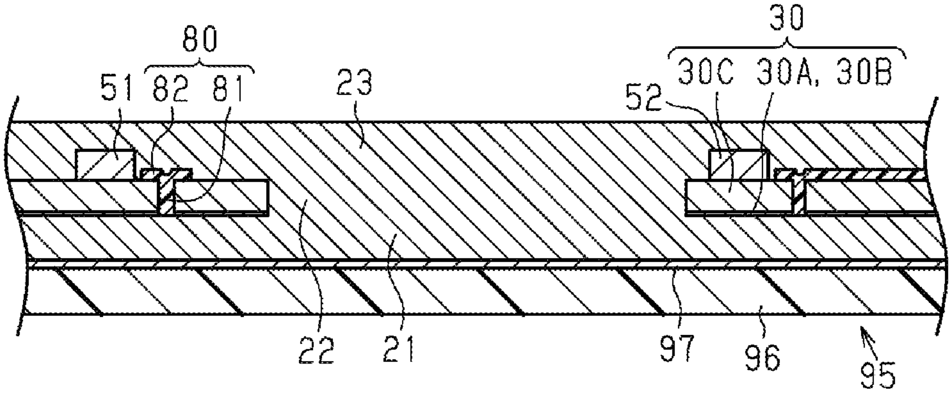
FIG. 16 is an explanatory diagram of the manufacturing method of the inductor component in the first embodiment.

The second magnetic layer processing step is performed next to the second resist layer removing step. In the second magnetic layer processing step, first, a magnetic material is filled from the upper side face of the first magnetic layer 21 toward the upper side relative to the upper ends of the first vertical wiring line 51 and the second vertical wiring line 52 in the lamination direction as illustrated in FIG. 16. Next, the second magnetic layer 22 and the third magnetic layer 23 are formed by grinding the magnetic material from the upper side in the lamination direction until the upper ends of the first vertical wiring line 51 and the second vertical wiring line 52 are exposed.

Figure 17:
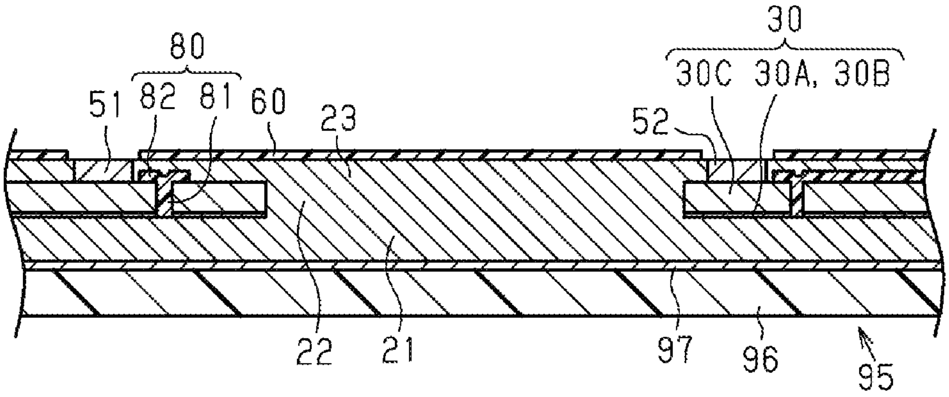
FIG. 17 is an explanatory diagram of the manufacturing method of the inductor component in the first embodiment.

The covering layer processing step is performed next to the second magnetic layer processing step. In the covering layer processing step, a solder resist functioning as the covering layer 60 is patterned by photolithography on the portion on which the outer electrode 70 is not formed among the portions of the upper side face of the third magnetic layer 23, the upper side face of the first vertical wiring line 51, and the upper side face of the second vertical wiring line 52, as illustrated in FIG. 17.

Figure 18:
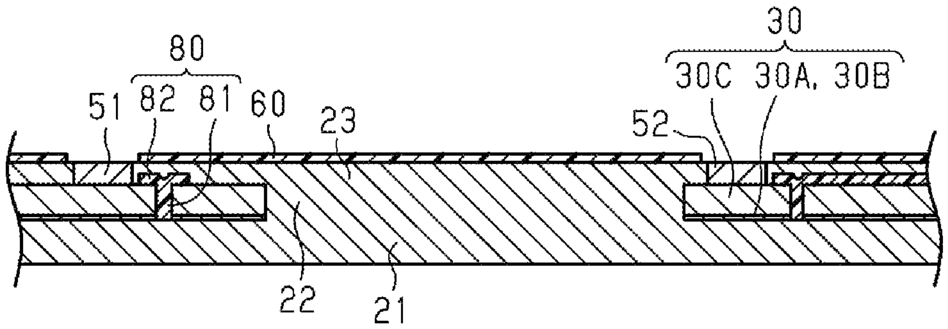
FIG. 18 is an explanatory diagram of the manufacturing method of the inductor component in the first embodiment.

The base substrate removing step is performed next to the covering layer processing step. In the base substrate removing step, the base substrate with the copper foil 95 is removed as illustrated in FIG. 18. Specifically, the base substrate 96 is peeled off to remove from the first magnetic layer 21. Next, the copper foil 97 is removed by etching. Then, the first magnetic layer 21 is ground from the lower side in the lamination direction until the thickness from the lower end of the first magnetic layer 21 to the upper end of the covering layer 60 reaches a desired value.

Figure 19:
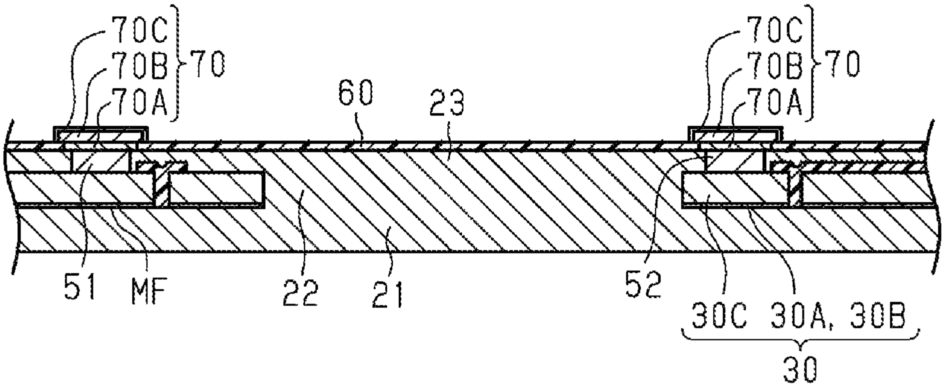
FIG. 19 is an explanatory diagram of the manufacturing method of the inductor component in the first embodiment.

The outer electrode processing step is performed next to the base substrate removing step. The outer electrode 70 is formed on the upper side face of the first vertical wiring line 51 as illustrated in FIG. 19. Further, the outer electrode 70 is formed on the upper side face of the second vertical wiring line 52. In the outer electrode 70, the copper layer 70A, the nickel layer 70B, and the gold layer 70C are formed by electroless plating for copper, nickel, and gold, respectively. Thus, the outer electrode 70 having a three-layer structure is formed.

Figure 20:
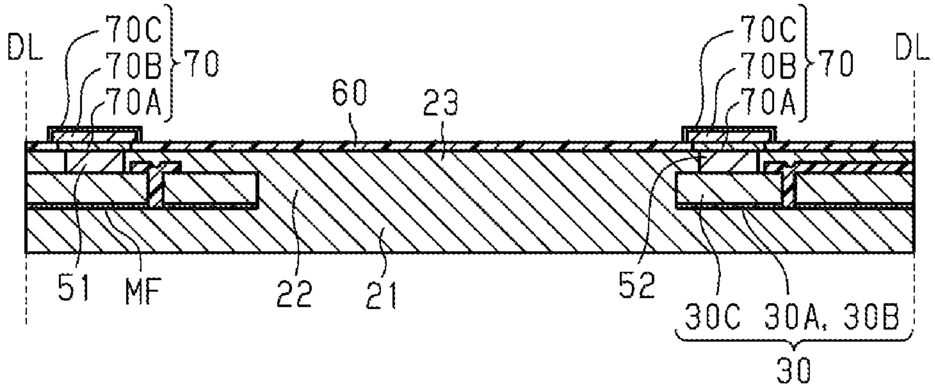
FIG. 20 is an explanatory diagram of the manufacturing method of the inductor component in the first embodiment.

The dividing step is performed next to the outer electrode processing step. Specifically, the dividing is performed by cutting with a dicing machine at break lines DL as illustrated in FIG. 20. Thus, the inductor component 10 may be obtained. In addition, at this time, the first dummy wiring line 41 and the second dummy wiring line 42 included in the break lines DL are exposed to the side faces of the inductor component 10.

Next, effects of the first embodiment will be described.

(1) According to the inductor component 10 in the first embodiment, in the second layer L2 in which the inductor wiring line 30 is disposed, the insulation layer 80 is disposed on part of the side face of the inductor wiring line 30. Therefore, the insulation property between the wiring lines in the inductor wiring line 30 may be ensured. On the other hand, the face of the surface of the inductor wiring line 30 on the first magnetic layer 21 side is not covered by the insulation layer 80, and is in contact with the first magnetic layer 21. The proportion of the insulation layer 80 in the inductor component 10 may be reduced and the proportion of the first magnetic layer 21 in the inductor component 10 may be increased because the insulation layer 80 does not exist on the face on the first magnetic layer 21 side. Therefore, when the volume of the inductor component 10 is the same, it is advantageous in terms of inductance because the proportion of the first magnetic layer 21 is large.

(2) According to the inductor component 10 in the first embodiment, the number of turns of the inductor wiring line 30 is about 1.5 turns. Since the number of turns of the inductor wiring line 30 is more than about 1.0 turns, there is an area in which the wiring lines in the inductor wiring line 30 become close to each other in some extent. According to the first embodiment described above, the insulation layer 80 is interposed between the wiring lines in the inductor wiring line 30 where the distance between the wiring lines in the inductor wiring line 30 is the smallest. Therefore, it is possible to ensure the insulation property at a portion where the wiring lines in the inductor wiring line 30 are likely to be short-circuited.

(3) According to the inductor component 10 in the first embodiment, part of the face of the inductor wiring line 30 on the third magnetic layer 23 side is covered by the insulation layer 80. Therefore, the insulation property with the side of the third magnetic layer 23 on which the outer electrode 70 is disposed may easily be ensured.

(4) According to the inductor component 10 in the first embodiment, the thickness TC of the second wiring line layer 30C is equal to or larger than about five times the thickness TB of the first wiring line layer 30B. Therefore, the thickness TA of the inductor wiring line 30 may be increased to some extent and a DC resistance may be reduced.

(5) According to the manufacturing method of the inductor component 10 in the first embodiment, the electrolytic copper plating is performed, and the second wiring line layer 30C is formed on the surface of the first wiring line layer 30B. The second wiring line layer 30C has the copper ratio equal to or larger than about 99 wt % and the nickel ratio equal to or less than the detection limit. Therefore, the second wiring line layer 30C having a large thickness may be efficiently formed compared with the electroless copper plating.

(6) According to the inductor component 10 in the first embodiment, the catalyst layer 30A is disposed on the first magnetic layer 21 side of the first wiring line layer 30B. The catalyst layer 30A activates the deposition of copper in the electroless copper plating. Therefore, since palladium as the catalyst is adsorbed in a layered manner on the entire surface of the first magnetic layer 21, copper is deposited on the entire surface of the first magnetic layer 21 when the electroless copper plating is performed. This makes it easy to form the first wiring line layer 30B having a uniform thickness.

(7) According to the inductor component 10 in the first embodiment, the covering layer 60 covers the upper face of the third layer L3. Therefore, the insulation property with the external factors may easily be ensured.

(8) According to the inductor component 10 in the first embodiment, the insulation layer 80 contains epoxy-based resin and an inorganic filler. Therefore, a physical defect such as a crack is unlikely to occur when the thickness of the first magnetic layer 21 is reduced to some extent, and sufficient strength may be maintained without an additive insulation substrate or the like.

(9) According to the inductor component 10 in the first embodiment, the anchor portion 34 extends from the lower side face of the catalyst layer 30A constituting the main face MF of the inductor wiring line 30. The anchor portion 34 covers the surfaces of the magnetic metal powders 20B dispersed in the base material 20A of the first magnetic layer 21. Therefore, an anchor effect is obtained between the inductor wiring line 30 and the first magnetic layer 21 by the anchor portion 34. As a result, adhesion between the inductor wiring line 30 and the first magnetic layer 21 is improved. Thus, in the inductor component 10, it is achieved that the inductor wiring line 30 is directly laminated on the first magnetic layer 21 while ensuring the required adhesion between the inductor wiring line 30 and the first magnetic layer 21.

(10) According to the inductor component 10 in the first embodiment, the magnetic metal powder 20B covered by the anchor portion 34 includes a cross section in which equal to or more than about one-third of the surface is covered by the anchor portion 34 when the magnetic metal powder 20B is viewed in a cross section. Therefore, the relatively large anchor portion 34 allows reliable close contact between the inductor wiring line 30 and the first magnetic layer 21.

(11) According to the manufacturing method of the inductor component 10 in the first embodiment, the magnetic metal powder 20B is exposed on part of the surface of the first magnetic layer 21 in the inductor wiring line processing step, and the inductor wiring line 30 is formed on part of the surface of the first magnetic layer 21 by immersing the first magnetic layer 21 in a plating solution. Therefore, the plating liquid enters the gap between the base material 20A and the magnetic metal powder 20B in the first magnetic layer 21, and the anchor portion 34 may be formed on the surface of the magnetic metal powder 20B on the inner side of the base material 20A.

(12) According to the manufacturing method of the inductor component 10 in the first embodiment, the electroless copper plating is performed by performing immersion in the electroless copper plating solution, and the first wiring line layer 30B having a copper ratio equal to or less than about 99 wt % and a nickel ratio equal to or larger than about 0.1 wt % is formed on the upper side face of the catalyst layer 30A. Therefore, damage to the surface of the first magnetic layer 21, in a case where the first wiring line layer 30B is formed by such as sputtering for example, is made relatively small, and the first wiring line layer 30B may be formed without excessively reducing the amount of the magnetic metal powder 20B in the first magnetic layer 21.

(13) According to the inductor component 10 in the first embodiment, iron being a material of the magnetic metal powder 20B has a higher ionization tendency than copper being the material of the first wiring line layer 30B. Therefore, iron having a large ionization tendency becomes ions and copper having a small ionization tendency deposits between the copper salt in the electroless copper plating and the surface of the magnetic metal powder 20B. With this, it is possible for copper to deposit so as to cover the surface of the magnetic metal powder 20B even when the base material 20A and the magnetic metal powder 20B are relatively dense.

Second Embodiment

Hereinafter, a second embodiment of the inductor component will be described.

Figure 21:
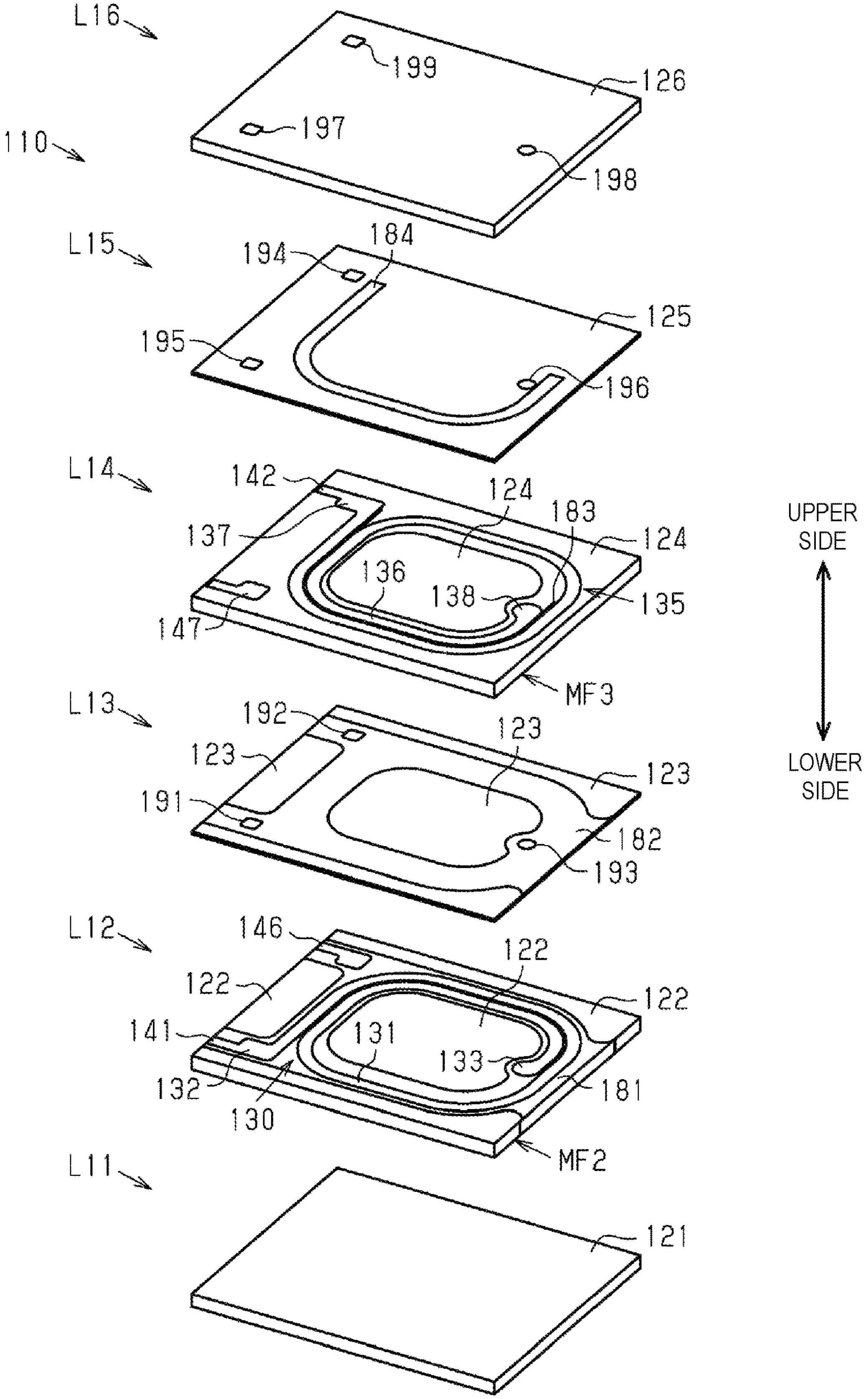
FIG. 21 is an exploded perspective view of an inductor component in a second embodiment.

An inductor component 110 has, as a whole, a structure in which six plate-shape layers are laminated in a thickness direction as illustrated in FIG. 21. In the following description, the lamination direction in which six layers each are laminated will be described as an up-down direction.

Figure 24:
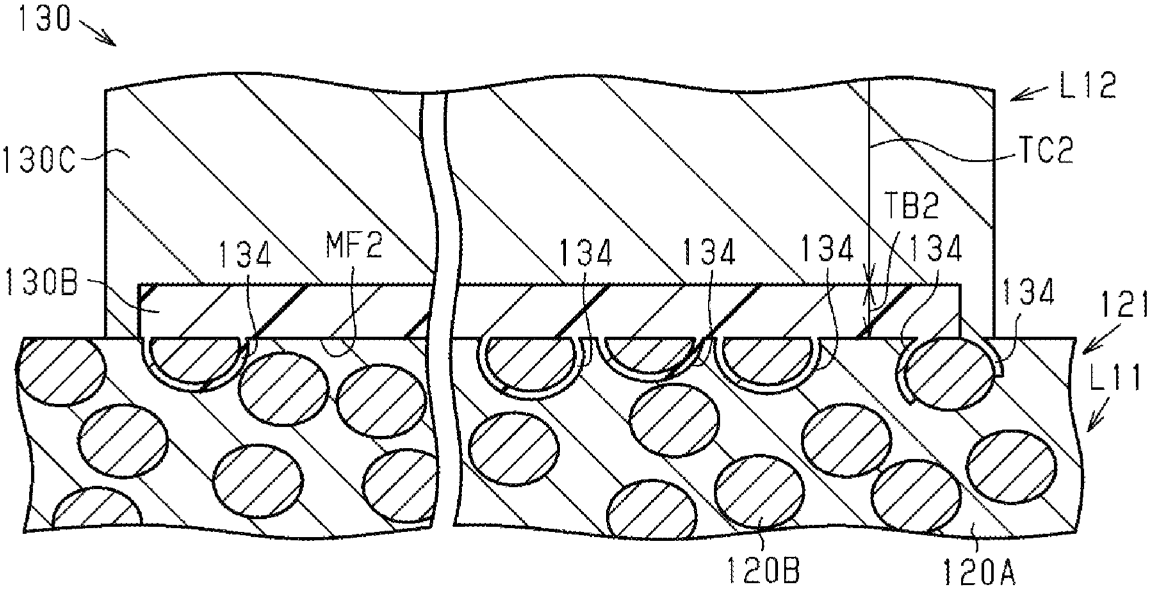
FIG. 24 is an enlarged sectional view of the inductor component in the second embodiment.

A first layer L11 has a substantially rectangular shape when viewed in the up-down direction. The first layer L11 is constituted of only a first magnetic layer 121. Magnetic metal powders 120B are dispersed in a base material 120A made of an insulation material in the first magnetic layer 121 as illustrated in FIG. 24. The first magnetic layer 121, therefore, is a magnetic material as a whole. Specifically, the base material 120A is composed of epoxy-based resin and an inorganic filler having an average particle size equal to or less than about 1.0 μm, and the magnetic metal powder 120B is an alloy made of iron, silicon, and chromium and the average particle size of the magnetic metal powder 120B is equal to or less than about 5.0 μm. In the embodiment, the first layer L11 is the lowermost layer in the up-down direction. That is, in the up-down direction, the side on which an outer electrode 230 is provided is referred to as an upper side, and the opposite side thereof is referred to as a lower side. The outer electrode 230 will be described later.

A second layer L12 having the substantially rectangular shape same as the first layer L11 when viewed in the up-down direction is laminated on the upper side face of the first layer L11 in the lamination direction as illustrated in FIG. 21. In the embodiment, the face of the second layer L12 contacting with the first layer L11 is a main face MF2 of the second layer L12. The second layer L12 is constituted of a second magnetic layer 122, a first inductor wiring line 130, a first dummy wiring line 141, a first connection wiring line 146, and a first insulation portion 181. The first inductor wiring line 130 is constituted of a first wiring line main body 131 having a substantially constant wiring line width, a first pad 132 connected to a first end of the first wiring line main body 131, and a second pad 133 connected to a second end of the first wiring line main body 131. The first inductor wiring line 130, therefore, is laminated on the outer face of the first magnetic layer 121.

Figure 22:
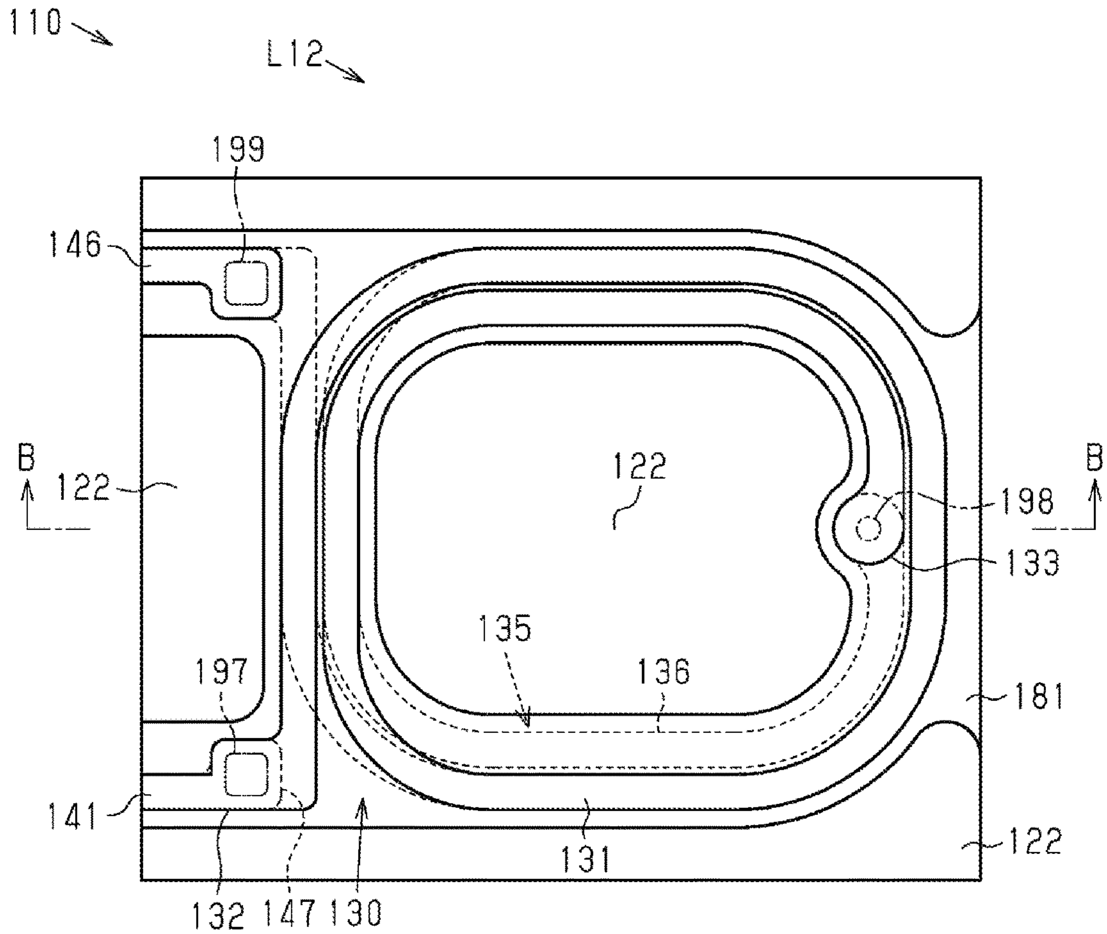
FIG. 22 is a top view of a second layer in the second embodiment.

In the second layer L12, when viewed from the upper side in the up-down direction, the first wiring line main body 131 of the first inductor wiring line 130 spirally extends around the vicinity of the center of the face of the second layer L12 having a substantially rectangular shape on the side opposite to the main face MF2 as illustrated in FIG. 22. Specifically, the first wiring line main body 131 of the first inductor wiring line 130 is spirally wound in a clockwise direction from the first end in the outer side portion in the radial direction toward the second end in the inner side portion in the radial direction.

An angle in which the first inductor wiring line 130 is wound is about 540 degrees in the embodiment. With this, the number of turns of the wound first inductor wiring line 130 is about 1.5 turns in the embodiment. In addition, when the second layer L12 is viewed from the upper side in the up-down direction, the side on which the first end of the first wiring line main body 131 is disposed is referred to as a first end side, and the side on which the second end of the first wiring line body 131 is disposed is referred to as a second end side in a long-side direction of the second layer L12 having a substantially rectangular shape in the embodiment.

The first pad 132 is connected to the first end on one side of the extending direction of the first wiring line main body 131. The first pad 132 has a substantially rectangular shape when viewed from the upper side in the up-down direction. The first pad 132 constitutes a first end portion of the first inductor wiring line 130. The first pad 132 is disposed in the vicinity of the corner of the second layer L12 having a substantially rectangular shape when viewed in the up-down direction. The wiring line width of the first pad 132 is larger than the wiring line width of the first wiring line main body 131 connected to the first pad 132.

The second pad 133 is connected to the second end on the other side in the extending direction of the first wiring line main body 131. The second pad 133 has a substantially circular shape when viewed from the upper side in the up-down direction. The second pad 133 constitutes a second end portion of the first inductor wiring line 130. The diameter of the circle of the second pad 133 is larger than the width of the first wiring line main body 131 connected to the second pad 133.

The first dummy wiring line 141 is connected to the first pad 132. The first dummy wiring line 141 extends from the portion of the first pad 132 on the side opposite to the first wiring line main body 131 toward the side face of the second layer L12, and is exposed to the outer face of the inductor component 110.

In the second layer L12, when viewed from the upper side in the up-down direction, the first connection wiring line 146 is disposed on the side opposite to the first pad 132 in a short-side direction of the second layer L12 having a substantially rectangular shape and in the vicinity of the corner on the first end side in the long-side direction. The first connection wiring line 146 has the same shape as the first pad 132 and the first dummy wiring line 141, and is line-symmetric with the first pad 132 and the first dummy wiring line 141. The symmetric axis is a straight line passing through the center of the second layer L12 in the short-side direction and extending in the long-side direction of the second layer L12.

Figure 23:
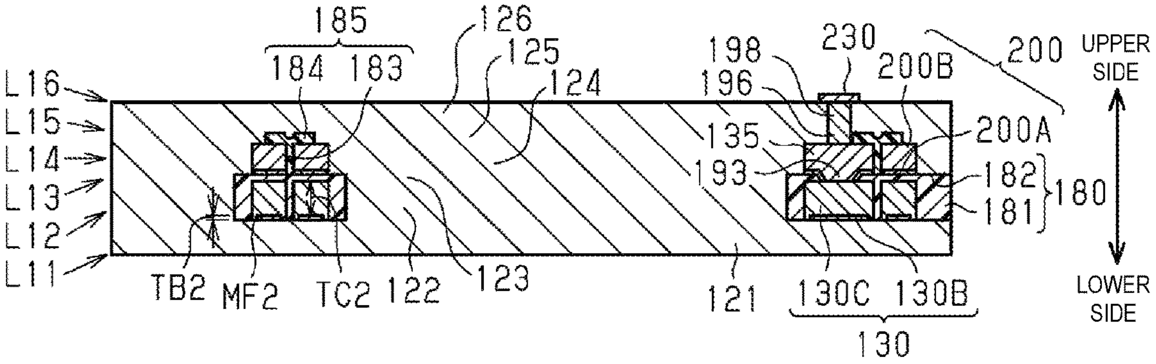
FIG. 23 is a sectional view of the inductor component in the second embodiment taken along a line B-B in FIG. 22.

The first inductor wiring line 130 has a laminated structure including a first wiring line layer 130B and a second wiring line layer 130C in order from the side of the first magnetic layer 121 constituting the first layer L11 as illustrated in FIG. 23. The first wiring line layer 130B of the first inductor wiring line 130 is in contact with the upper face of the first magnetic layer 121, and constitutes most of the face of the first inductor wiring line 130 constituting the main face MF2 of the second layer L12.

The material of the first wiring line layer 130B has a copper ratio equal to or less than about 99 wt % and a nickel ratio equal to or larger than about 0.1 wt %. A thickness TB2 of the first wiring line layer 130B is equal to or less than about one-tenth of the wiring line width of the inductor wiring line 30. The thickness TB2 of the first wiring line layer 130B is about 2.0 m in this embodiment. The thickness TB2 of the first wiring line layer 130B is determined as follows. The thickness from the upper end of the first magnetic layer 121 to the upper end of the first wiring line layer 130B in a cross section along the lamination direction is measured at three points in one observation field under a microscope of 1500 times magnification. The thickness TB2 of the first wiring line layer 130B is determined as the average value of the three measured values. The thickness TB2 of the first wiring line layer 130B is substantially constant in the embodiment. Note that the wiring line width of the first inductor wiring line 130 is determined as the average value of three points of the width dimension of the first inductor wiring line 130 in the vicinity of the center in the extending direction.

The second wiring line layer 130C is laminated on the upper side surface of the first wiring line layer 130B on the side opposite to the first magnetic layer 121. Further, the second wiring line layer 130C covers an area slightly wider than the first wiring line layer 130B from the upper side in the lamination direction. That is, the side face of the surface of the first wiring line layer 130B facing the direction orthogonal to the lamination direction is covered by the second wiring line layer 130C. Part of the outer face of the second wiring line layer 130C constitutes part of the face of the first inductor wiring line 130 constituting the main face MF2 of the second layer L12.

A thickness TC2 of the second wiring line layer 130C is equal to or about five times larger than the thickness TB2 of the first wiring line layer 130B. The thickness TC2 of the second wiring line layer 130C is about 45 μm in the embodiment. Thus, the thickness of the first inductor wiring line 130 constituted of the first wiring line layer 130B and the second wiring line layer 130C is about 47 μm. The thickness TC of the second wiring line layer 130C is determined as follows. The thickness from the upper end of the first wiring line layer 130B to the upper end of the second wiring line layer 130C in a cross section including the lamination direction is measured at three points in one observation field under a microscope of 1500 times magnification. The thickness TC of the second wiring line layer 130C is determined as the average value of the three measured values. The material of the second wiring line layer 130C has a copper ratio equal to or larger than about 99 wt %, and the nickel ratio is equal to or less than the detection limit.

An anchor portion 134 extends from the main face MF2 of the first inductor wiring line 130 as illustrated in FIG. 24. The anchor portion 134 extends from both of the first wiring line layer 130B and the second wiring line layer 130C constituting the main face MF2 of the first inductor wiring line 130 in the embodiment. The anchor portion 134 covers the surfaces of the magnetic metal powders 120B in contact with the main face MF2 among the large number of magnetic metal powders 120B in the first magnetic layer 121. The anchor portion 134 extends from the main face MF2 so as to enter a gap between the base material 120A and the magnetic metal powder 120B in the first magnetic layer 121. Further, the magnetic metal powder 120B covered by the anchor portion 134 includes a cross section in which equal to or larger than about one-third of the surface is covered by the anchor portion 134 when the magnetic metal powder 120B is viewed in a cross section.

In the second layer L12, the side face of the first inductor wiring line 130, the side face of the first dummy wiring line 141, and the side face of the first connection wiring line 146 are covered by the first insulation portion 181 as illustrated in FIG. 22. That is, the first inductor wiring line 130, the first dummy wiring line 141, and the first connection wiring line 146 are surrounded by the first insulation portion 181. The first insulation portion 181 is insulation resin with an insulation property, and the insulation performance thereof is higher than that of the first inductor wiring line 130. Further, the first insulation portion 181 contains an inorganic filler. The portion other than the first inductor wiring line 130, the first dummy wiring line 141, the first connection wiring line 146, and the first insulation portion 181 is the second magnetic layer 122. Therefore, the second magnetic layer 122 is disposed in the central portion of the second layer L12, the both end portions of the second layer L12 in the short-side direction, and the first end side portion of the second layer L12 in the long-side direction. The material of the second magnetic layer 122 is the same as that of the first magnetic layer 121. As described above, since the first layer L11 is constituted of only the first magnetic layer 121, the lower face of the first inductor wiring line 130 is in contact with the first magnetic layer 121 without the first insulation portion 181 interposed therebetween.

A third layer L13 having the substantially rectangular shape same as the second layer L12 when viewed in the up-down direction is laminated on the upper face of the second layer L12. The third layer L13 is constituted of a second insulation portion 182, a first via 191, a second via 192, a third via 193, and a third magnetic layer 123.

The first via 191 is disposed on the upper side of the first pad 132 of the second layer L12, and is connected to the first pad 132. The second via 192 is disposed on the upper side of the first connection wiring line 146 of the second layer L12, and is connected to the first connection wiring line 146. The third via 193 is disposed on the upper side of the second pad 133 of the second layer L12, and is connected to the second pad 133. The first via 191, the second via 192, and the third via 193 have a substantially columnar shape, and the axial direction thereof coincides with the lamination direction. The length of the first via 191, the second via 192, and the third via 193 in the lamination direction is the same as the thickness of the third layer L13 in the lamination direction. Thus, the first via 191, the second via 192, and the third via 193 penetrate through the third magnetic layer 123 in the lamination direction.

The second insulation portion 182 covers the first inductor wiring line 130, the first dummy wiring line 141, the first connection wiring line 146, and the first insulation portion 181 from the upper side. That is, the second insulation portion 182 covers all the face, of the upper face of the respective wiring lines disposed in the second layer L12, other than the portions where the first via 191, the second via 192, and the third via 193 are disposed. The second insulation portion 182 has a shape to cover an area slightly wider than the outer edges of the first inductor wiring line 130, the first dummy wiring line 141, and the first connection wiring line 146 when viewed from the upper side in the up-down direction. The second insulation portion 182 is insulation resin with an insulation property similar to the first insulation portion 181, and contains an inorganic filler. Note that a first insulation layer 180 is constituted of the first insulation portion 181 and the second insulation portion 182 in the embodiment. That is, of the surface of the first inductor wiring line 130, the portion of the upper side face in the lamination direction and of the face on the second magnetic layer 122 side excluding the first via 191 and the third via 193 is covered by the first insulation layer 180, and is in contact with the first insulation layer 180 in the embodiment.

In the third layer L13, the portion excluding the first via 191, the second via 192, the third via 193, and the second insulation portion 182 is the third magnetic layer 123. Therefore, the third magnetic layer 123 is disposed in the central portion of the third layer L13, the both end portions of the third layer L13 in the short-side direction, and the first end side portion of the third layer L13 in the long-side direction. The third magnetic layer 123 is made of the same magnetic material as the first magnetic layer 121 described above.

A fourth layer L14 having the substantially rectangular shape same as the third layer L13 when viewed in the up-down direction is laminated on the upper face of the third layer L13. The fourth layer L14 is constituted of a second inductor wiring line 135, a second dummy wiring line 142, a second connection wiring line 147, a third insulation portion 183, and a fourth magnetic layer 124. The second inductor wiring line 135 is constituted of a second wiring line main body 136 having a substantially constant wiring line width, a third pad 137 connected to a first end of the second wiring line main body 136, and a fourth pad 138 connected to a second end of the second wiring line main body 136. That is, the second inductor wiring line 135 is disposed on the upper side main face of the third magnetic layer 123 on the side opposite to the first inductor wiring line 130, and is laminated on the first inductor wiring line 130 with an interval of the third layer L13 in the lamination direction. Further, the third pad 137 serves as a first end portion of the second inductor wiring line 135, and the fourth pad 138 serves as a second end portion of the second inductor wiring line 135 in the embodiment.

In the fourth layer L14, when viewed from the upper side in the up-down direction, the second wiring line main body 136 of the second inductor wiring line 135 spirally extends around the vicinity of the center of the face of the fourth layer L14 having a substantially rectangular shape on the side opposite to a main face MF3. Specifically, the second wiring line main body 136 of the second inductor wiring line 135 is spirally wound in the counterclockwise direction from the first end in the outer side portion in the radial direction toward the second end in the inner side portion in the radial direction. That is, the winding direction of the second inductor wiring line 135 is opposite to the winding direction of the first inductor wiring line 130.

The angle in which the second inductor wiring line 135 is wound is about 540 degrees in the embodiment. With this, the number of turns of the wound second inductor wiring line 135 is about 1.5 turns in the embodiment.

The third pad 137 is connected to the first end on one side of the extending direction of the second wiring line main body 136. The third pad 137 has a substantially rectangular shape when viewed in the up-down direction. The third pad 137 constitutes a first end portion of the second inductor wiring line 135. The third pad 137 is disposed in the vicinity of the corner of the fourth layer L14 having a substantially rectangular shape when viewed in the up-down direction. The third pad 137 is wider than the second wiring line main body 136 connected to the third pad 137 in the wiring line width.

The fourth pad 138 is connected to a second end on the other side in the extending direction of the second wiring line main body 136. The fourth pad 138 has a substantially circular shape when viewed in the up-down direction. The fourth pad 138 is positioned on the upper side of the second pad 133 in the second layer L12, and is connected to the second pad 133 through the third via 193. The fourth pad 138 is wider than the second wiring line main body 136 connected to the fourth pad 138 in the wiring line width. The fourth pad 138 constitutes a second end portion of the second inductor wiring line 135.

The second dummy wiring line 142 is connected to the third pad 137. The second dummy wiring line 142 extends from the portion of the third pad 137 on the side opposite to the second wiring line main body 136 toward the side face of the fourth layer L14, and is exposed to the outer face of the second inductor wiring line 135.

In the fourth layer L14, when viewed from the upper side in the up-down direction, the second connection wiring line 147 is disposed on the side opposite to the third pad 137 in the short-side direction of the fourth layer L14 having a substantially rectangular shape and in the vicinity of the corner of the first end side in the long-side direction. The second connection wiring line 147 has the same shape as the third pad 137 and the second dummy wiring line 142, and is line-symmetric with the third pad 137 and the second dummy wiring line 142. The symmetric axis is a straight line passing through the center of the fourth layer L14 in the short-side direction and extending in the long-side direction of the fourth layer L14. The second inductor wiring line 135 and the second connection wiring line 147 are illustrated by a broken line in FIG. 22.

The third via 193 is integrated with the second inductor wiring line 135 as illustrated in FIG. 23. Although not illustrated in the drawings, the second via 192, the second dummy wiring line 142, and the second inductor wiring line 135 are integrated with one another. Further, the second connection wiring line 147 and the first via 191 are integrated with each other. The integrated object above described will be referred to as a second conductive layer 200 in the following description. The second conductive layer 200 has a laminated structure including a third wiring line layer 200A and a fourth wiring line layer 200B. The third wiring line layer 200A constitutes part of the lower end side of the second conductive layer 200. Therefore, the portion of the third wiring line layer 200A positioned on the lower side of the first via 191 and the third via 193 is in contact with the first inductor wiring line 130. In addition, the portion of the third wiring line layer 200A positioned on the lower side of the second via 192 is in contact with the first connection wiring line 146. Further, the portion of the third wiring line layer 200A positioned on the lower side of other than the first via 191, the second via 192, and the third via 193 is in contact with the upper face of the second insulation portion 182. The material of the third wiring line layer 200A contains titanium and chromium.

The fourth wiring line layer 200B is laminated on the upper side surface of the third wiring line layer 200A on the side opposite to the third magnetic layer 123. The material of the fourth wiring line layer 200B has a copper ratio equal to or larger than about 99 wt %. The upper end of the fourth wiring line layer 200B is flush with the upper end of the fourth layer L14.

In the fourth layer L14, the gap between the side faces of the second inductor wiring line 135 is covered by the third insulation portion 183 as illustrated in FIG. 21. Therefore, the third insulation portion 183 is interposed at the portion where the distance between the wiring lines in the second inductor wiring line 135 is the shortest. The third insulation portion 183 is insulation resin with an insulation property, and the insulation performance thereof is higher than that of the second inductor wiring line 135. In addition, the third insulation portion 183 does not contain an inorganic filler, unlike the first insulation layer 180. The shape of the third insulation portion 183 is a curved shape as a whole.

The portion other than the second inductor wiring line 135, the second dummy wiring line 142, the second connection wiring line 147, and the third insulation portion 183 is the fourth magnetic layer 124. Therefore, the fourth magnetic layer 124 is disposed in the central portion of the fourth layer L14, the both end portions of the fourth layer L14 in the short-side direction, and the first end side portion of the fourth layer L14 in the long-side direction. The material of the fourth magnetic layer 124 is the same as that of the first magnetic layer 121.

A fifth layer L15 having the substantially rectangular shape same as the fourth layer L14 when viewed in the up-down direction is laminated on the upper face of the surface of the fourth layer L14. The fifth layer L15 is constituted of a fifth magnetic layer 125, a fourth insulation portion 184, a first columnar wiring line 194, a second columnar wiring line 195, and a third columnar wiring line 196. The fifth magnetic layer 125 is disposed on the upper side of the second inductor wiring line 135 and the fourth magnetic layer 124 opposite to the first inductor wiring line 130. The first columnar wiring line 194, the second columnar wiring line 195, and the third columnar wiring line 196 penetrate through the fifth layer L15 in the lamination direction, that is, penetrate through the fifth layer L15 from the face on the fourth magnetic layer 124 side toward the face on the side opposite to the fourth magnetic layer 124 side face. These columnar wiring lines function as vertical wiring lines in the embodiment.

The fourth insulation portion 184 is directly connected to the upper side face of the third insulation portion 183 without any other layers interposed therebetween. The fourth insulation portion 184 covers a wider area than the third insulation portion 183 in the width direction orthogonal to the extending direction of the third insulation portion 183. The thickness of the fourth insulation portion 184 is identical with the thickness of the fifth layer L15. The fourth insulation portion 184 is insulation resin with an insulation property similar to the third insulation portion 183, and the insulation performance thereof is higher than that of the second inductor wiring line 135. Note that the second insulation layer 185 is constituted of the third insulation portion 183 and the fourth insulation portion 184 in the embodiment. The second insulation layer 185 is a non-magnetic material in contact with part of the surface of the second inductor wiring line 135. Note that the face of the surface of the second inductor wiring line 135 on the first inductor wiring line 130 side is in contact with the first insulation layer 180, and the face of the surface of the second inductor wiring line 135 on the fourth magnetic layer 124 side is in contact with the second insulation layer 185.

In the fifth layer L15, the portion excluding the first columnar wiring line 194, the second columnar wiring line 195, the third columnar wiring line 196, and the fourth insulation portion 184 is the fifth magnetic layer 125. The material of the fifth magnetic layer 125 is the same as that of the first magnetic layer 121 described above and is a magnetic material.

A sixth layer L16 having the substantially rectangular shape same as the fifth layer L15 when viewed in the up-down direction is laminated on the upper face of the fifth layer L15. The sixth layer L16 is constituted of a sixth magnetic layer 126, a fourth columnar wiring line 197, a fifth columnar wiring line 198, and a sixth columnar wiring line 199.

The fourth columnar wiring line 197 is disposed on the upper side of the second connection wiring line 147 in the fourth layer L14, and is connected to the second connection wiring line 147 through the second columnar wiring line 195. The sixth columnar wiring line 199 is disposed on the upper side of the third pad 137 of the fourth layer L14, and is connected to the third pad 137 through the first columnar wiring line 194. The fourth columnar wiring line 197 and the sixth columnar wiring line 199 have a substantially prismatic shape, and the axial direction thereof coincides with the lamination direction. The length of the fourth columnar wiring line 197 and the sixth columnar wiring line 199 in the lamination direction is identical with the thickness of the sixth layer L16 in the lamination direction. Thus, the fourth columnar wiring line 197 and the sixth columnar wiring line 199 penetrate through the sixth layer L16 in the lamination direction. That is, the first columnar wiring line 194 and the sixth columnar wiring line 199 constitute a first vertical wiring line in the embodiment. Further, the second columnar wiring line 195 and the fourth columnar wiring line 197 constitute a third vertical wiring line.

In addition, the fifth columnar wiring line 198 is disposed on the upper side of the fourth pad 138 of the second inductor wiring line 135 in the fourth layer L14, and is connected to the fourth pad 138 through the third columnar wiring line 196. That is, the third columnar wiring line 196 and the fifth columnar wiring line 198 constitute a second vertical wiring line in the embodiment. Note that the fourth columnar wiring line 197, the fifth columnar wiring line 198, and the sixth columnar wiring line 199 are illustrated by a dashed-and-double-dotted line in FIG. 22.

In the sixth layer L16, the portion excluding the fourth columnar wiring line 197, the fifth columnar wiring line 198, and the sixth columnar wiring line 199 is the sixth magnetic layer 126 as illustrated in FIG. 21. Thus, the sixth magnetic layer 126 is laminated on the upper side of the second inductor wiring line 135. The material of the sixth magnetic layer 126 is the same as that of the first magnetic layer 121 described above and is a magnetic material.

The outer electrode 230 is laminated on the upper side face of the fifth columnar wiring line 198 as illustrated in FIG. 23. Further, the outer electrode 230 is connected to the upper side face of the fourth columnar wiring line 197 and the sixth columnar wiring line 199. Note that the outer electrode 230 is not illustrated in FIG. 21.

Next, a manufacturing method of the inductor component 110 in the second embodiment will be described.

Figure 25:
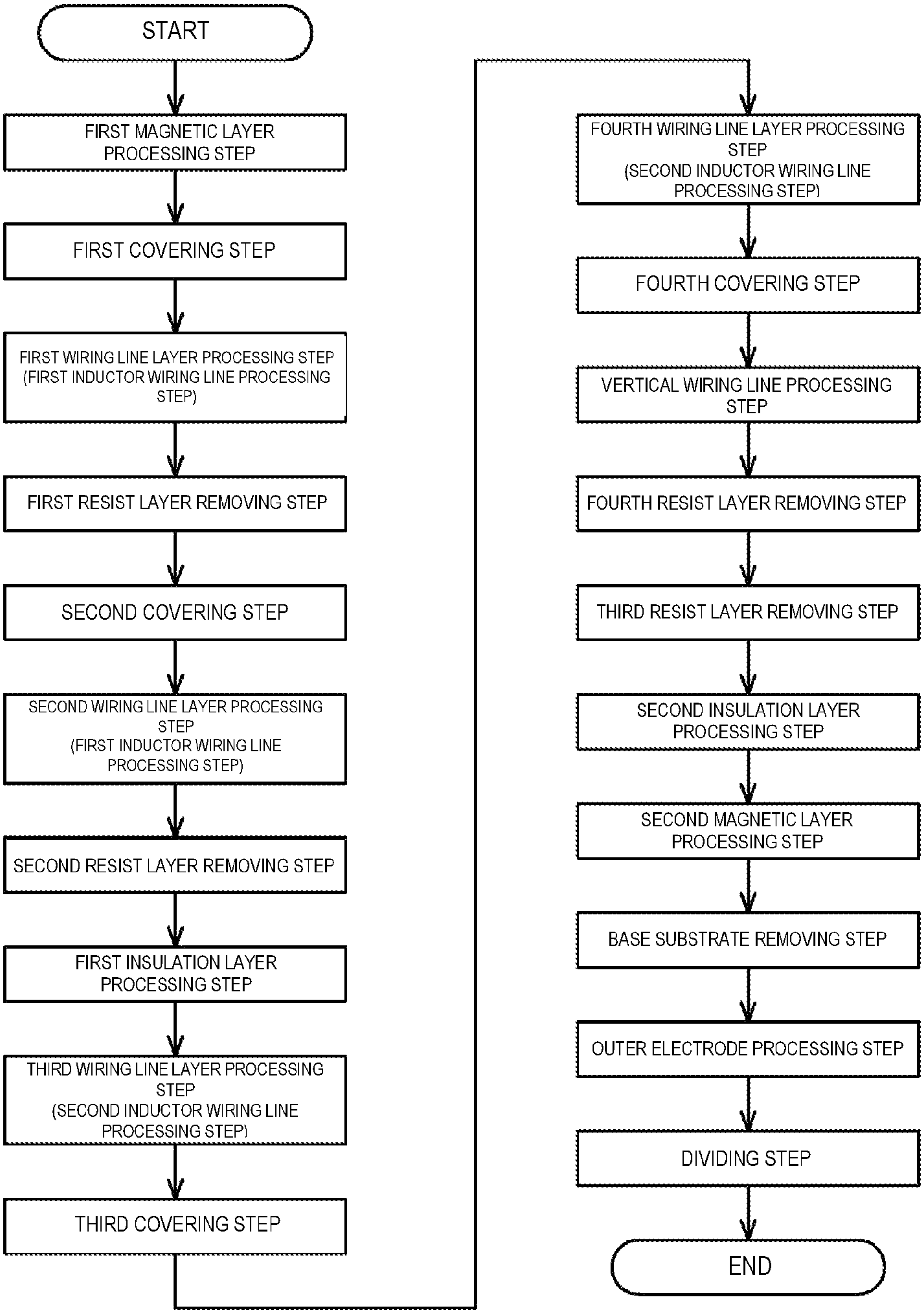
FIG. 25 is an explanatory diagram of a manufacturing method of the inductor component in the second embodiment.

As illustrated in FIG. 25, the manufacturing method of the inductor component 110 includes a first magnetic layer processing step, a first covering step, a first wiring line layer processing step, a first resist layer removing step, a second covering step, a second wiring line layer processing step, a second resist layer removing step, and a first insulation layer processing step, and the first inductor wiring line 130 is formed through the steps described above. Further, the manufacturing method of the inductor component 110 includes a third wiring line layer processing step, a third covering step, a fourth wiring line layer processing step, a fourth covering step, a vertical wiring line processing step, a fourth resist layer removing step, a third resist layer removing step, a second insulation layer processing step, a second magnetic layer processing step, a base substrate removing step, an outer electrode processing step, and a dividing step, and the second inductor wiring line 135 and the like are formed through the steps described above.

Figure 26:
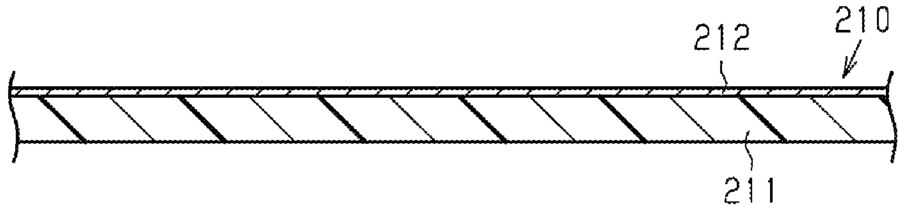
FIG. 26 is an explanatory diagram of the manufacturing method of the inductor component in the second embodiment.
Figure 27:
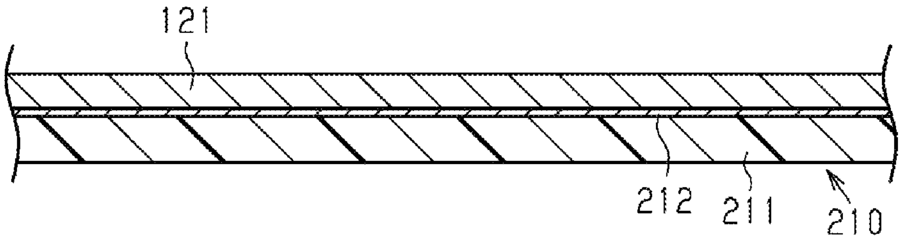
FIG. 27 is an explanatory diagram of the manufacturing method of the inductor component in the second embodiment.

In manufacturing the inductor component 110, first, the first magnetic layer processing step is performed. A base substrate with a copper foil 210 is prepared as illustrated in FIG. 26. A base substrate 211 of the base substrate with the copper foil 210 has a plate-shape. A copper foil 212 is laminated on the upper side face of the base substrate 211 in the lamination direction. Then, the first magnetic layer 121 composed of the base material 120A and the magnetic metal powder 120B is formed on the upper side face of the copper foil 212 of the base substrate with copper foil 210 as illustrated in FIG. 27. In forming the first magnetic layer 121, an insulation resin containing the magnetic metal powder 120B is applied, and the insulation resin is solidified by press working to obtain the base material 120A. Then, the upper portions of the base material 120A and the magnetic metal powder 120B are ground such that the thickness in the up-down direction of the first magnetic layer 121 becomes a desired thickness. When the grinding is performed, it is preferable to form a slight gap at the interface between the base material 120A and the magnetic metal powder 120B by controlling process parameters during grinding.

Figure 28:
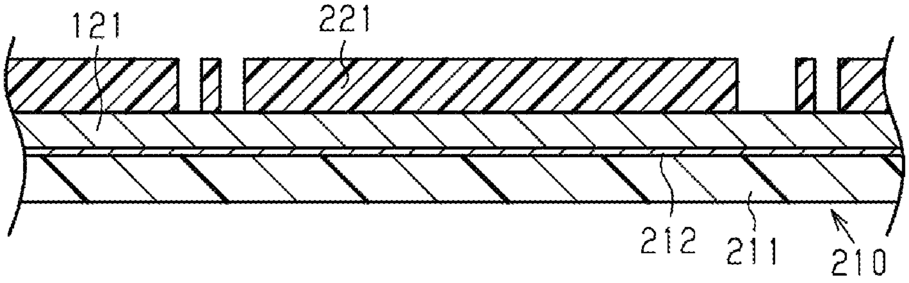
FIG. 28 is an explanatory diagram of the manufacturing method of the inductor component in the second embodiment.

The first covering step is performed next to the second magnetic layer processing step. In the first covering step, on the upper side face of the first magnetic layer 121, the first resist layer 221 covering the portion on which the first wiring line layer 130B is not formed is patterned as illustrated in FIG. 28. Specifically, first, the photosensitive dry film resist is applied to the entire upper side face of the first magnetic layer 121. Next, on the upper side face of the first magnetic layer 121, the portion on which the first wiring line layer 130B is not formed is exposed to light. As a result, on the applied dry film resist, the portion exposed to light is cured. Thereafter, the uncured portion of the applied dry film resist is removed by a chemical solution. Thus, on the applied dry film resist, the cured portion is formed as the first resist layer 221. On the other hand, the first magnetic layer 121 is exposed in the portion where the applied dry film resist is removed by a chemical solution and is not covered by the first resist layer 221.

Figure 29:
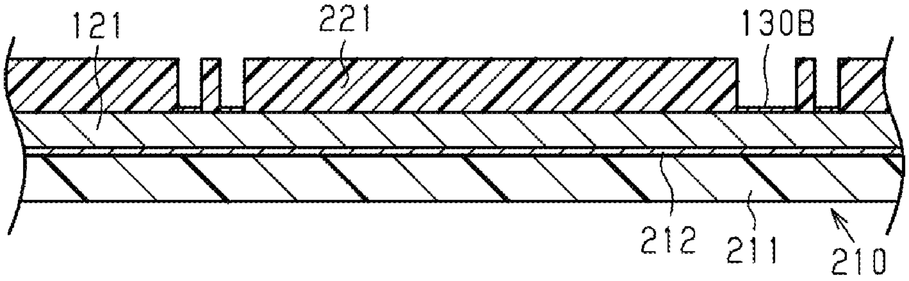
FIG. 29 is an explanatory diagram of the manufacturing method of the inductor component in the second embodiment.

The first wiring line layer processing step is performed next to the first covering step. In the first wiring line layer processing step, the first wiring line layer 130B is formed on the upper side face of the first magnetic layer 121 as illustrated in FIG. 29. Specifically, the electroless copper plating by performing immersion in the electroless copper plating solution forms the first wiring line layer 130B having a copper ratio equal to or less than about 99 wt % and a nickel ratio equal to or larger than about 0.1 wt % on the upper side face of the first magnetic layer 121 exposed from the first resist layer 221. The electroless copper plating solution is an alkaline solution, and contains copper salts such as copper chloride, copper sulfate and the like. On the other hand, the material of the magnetic metal powder 120B is iron, and the ionization tendency is larger than that of copper being the material of the first wiring line layer 130B. Therefore, in the first wiring line layer processing step, iron on the surface of the magnetic metal powder 120B dissolves, and instead, copper is deposited on the surface of the magnetic metal powder 120B.

Here, since the electroless copper plating solution enters a slight gap between the base material 120A and the magnetic metal powder 120B, the substitution of iron with copper occurs not only on the exposed face side of the magnetic metal powder 120B but also on the surface of the magnetic metal powder 120B on the inner side of the base material 120A. Then, copper deposited on the surface of the magnetic metal powder 120B on the inner side of the base material 120A functions as the anchor portion 134. Thus, the anchor portion 134 extending from the lower side face of the first wiring line layer 130B is formed with electroless copper plating.

Figure 30:
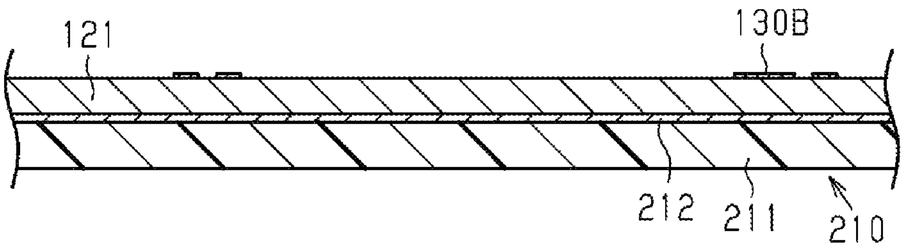
FIG. 30 is an explanatory diagram of the manufacturing method of the inductor component in the second embodiment.

The first resist layer removing step for removing the first resist layer 221 is performed next to the first wiring line processing step. In the first resist layer removing step, the first resist layer 221 is peeled off to remove from the first magnetic layer 121 as illustrated in FIG. 30.

Figure 31:
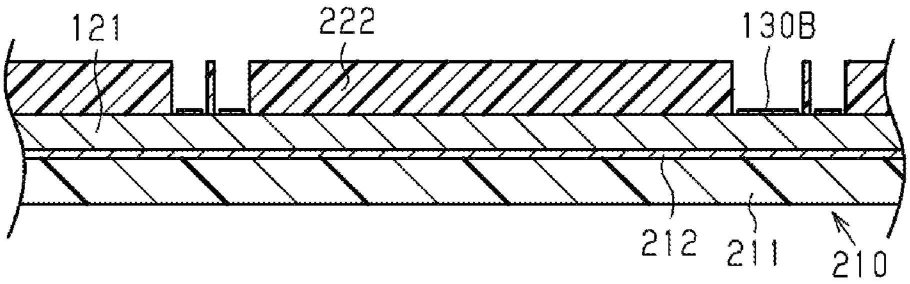
FIG. 31 is an explanatory diagram of the manufacturing method of the inductor component in the second embodiment.

The second covering step is performed next to the first resist layer removing step. In the second covering step, on the upper side face of the first magnetic layer 121, the second resist layer 222 covering the portion on which the second wiring line layer 130C is not formed is patterned as illustrated in FIG. 31. The second resist layer 222 is patterned such that an area slightly wider than the first wiring line layer 130B is exposed in the embodiment. Note that the aspect of the photolithography in the second covering step is the same as that in the first covering step and a detailed description thereof will be omitted.

The second wiring line layer processing step is performed next to the second covering step. In the second wiring line layer processing step, the second wiring line layer 130C is formed in the portion not covered by the second resist layer 222. Specifically, electrolytic copper plating is performed, and the second wiring line layer 130C having a copper ratio equal to or larger than about 99 wt % is formed on the surface not covered by the second resist layer 222. At this time, the end portion of the second wiring line layer 130C is in direct close contact with the first magnetic layer 121 not covered by the first wiring line layer 130B as illustrated in FIG. 24. Therefore, the plating solution for the electrolytic copper plating enters the gap between the base material 120A and the magnetic metal powder 120B in the first magnetic layer 121 being in contact with the lower side face of the second wiring line layer 130C. Copper precipitating from the plating solution and caught in the gap functions as the anchor portion 134. The first wiring line processing step and the second wiring line processing step described above are the inductor wiring line processing steps in the embodiment.

Figure 32:
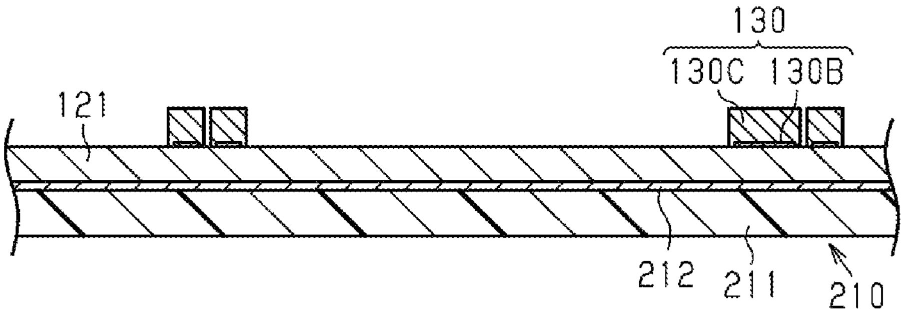
FIG. 32 is an explanatory diagram of the manufacturing method of the inductor component in the second embodiment.

The second resist layer removing step is performed next to the second wiring line layer processing step. In the second resist layer removing step, the second resist layer 222 is peeled off to remove from the first magnetic layer 121 as illustrated in FIG. 32.

Figure 33:
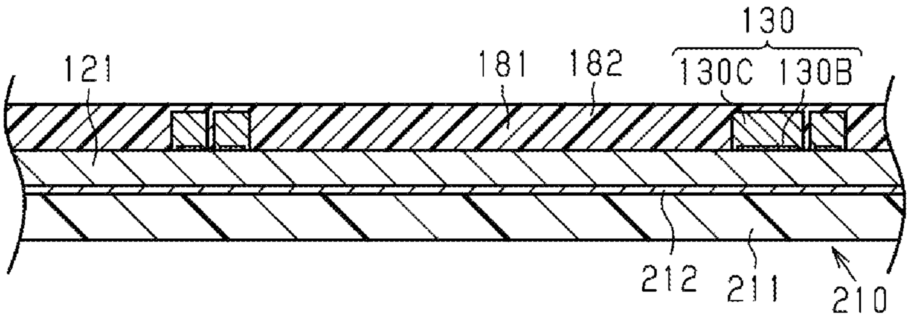
FIG. 33 is an explanatory diagram of the manufacturing method of the inductor component in the second embodiment.

The first insulation layer processing step is performed next to the second resist layer removing step. The first inductor wiring line 130 is covered by an insulation material from the upper side in the lamination direction as illustrated in FIG. 33. With this, the first insulation layer including the first insulation portion 181 and the second insulation portion 182 is formed on the entire upper side face of the first magnetic layer 121 and the first inductor wiring line 130.

Figure 34:
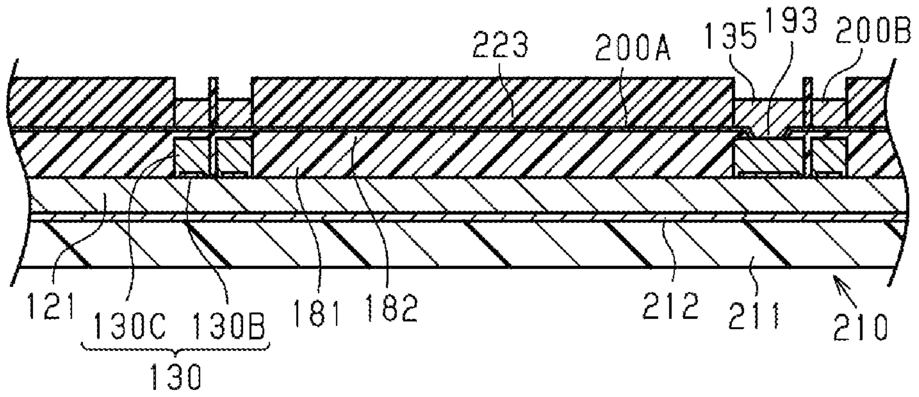
FIG. 34 is an explanatory diagram of the manufacturing method of the inductor component in the second embodiment.

The third wiring line processing step is performed next to the first insulation layer processing step. First, on the upper side face of the first inductor wiring line 130, a hole penetrating through the second insulation portion 182 is formed by laser at the portion on which the third via 193 is formed as illustrated in FIG. 34. With this, the upper side face of the first inductor wiring line 130 is exposed at the portion on which the third via 193 is formed. Next, the third wiring line layer 200A functioning as a seed layer is formed by sputtering from the upper side in the lamination direction. The material of the third wiring line layer 200A contains titanium and chromium.

The third covering step is performed next to the third wiring line processing step. In the third covering step, on the surface of the third wiring line layer 200A, the third resist layer 223 covering the portion on which the fourth wiring line layer 200B is not formed is patterned. Note that the aspect of the photolithography in the third covering step is the same as that in the first covering step and a detailed description thereof will be omitted.

The fourth wiring line layer processing step is performed next to the third covering step. In the fourth wiring line layer processing step, the electrolytic copper plating is performed, and on the surface of the third wiring line layer 200A, the fourth wiring line layer 200B having a copper ratio equal to or larger than about 99 wt % is formed on the portion not covered by the third resist layer 223.

Figure 35:
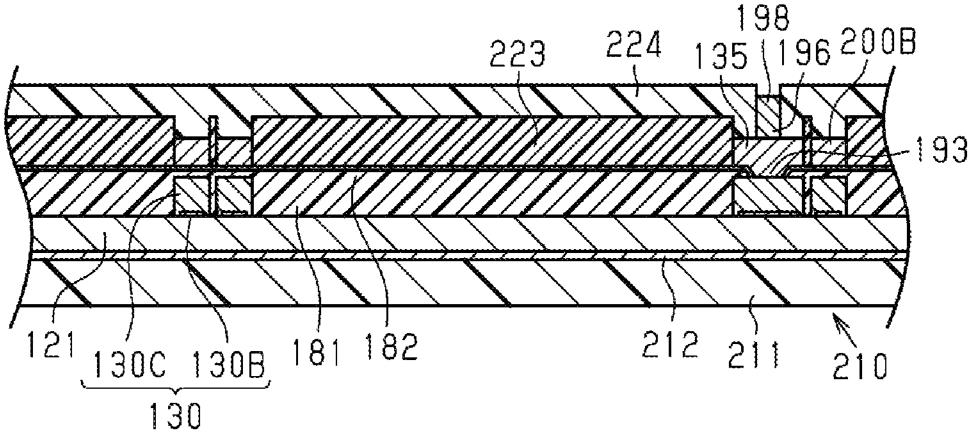
FIG. 35 is an explanatory diagram of the manufacturing method of the inductor component in the second embodiment.

The fourth covering step is performed next to the fourth wiring line processing step. In the fourth covering step, the fourth resist layer 224 covering the portion in which the vertical wiring line is not formed is patterned as illustrated in FIG. 35. That is, although not illustrated in the drawings, only the portions forming the first columnar wiring line 194, the second columnar wiring line 195, the third columnar wiring line 196, the fourth columnar wiring line 197, the fifth columnar wiring line 198, and the sixth columnar wiring line 199 are exposed from the fourth resist layer 224.

The vertical wiring line processing step is performed next to the fourth covering step. In the vertical wiring line processing step, the electrolytic copper plating is performed, and on the surface of the second wiring line layer 130C, each vertical wiring line of a copper ratio equal to or larger than about 99 wt % is formed on the portion not covered by the fourth resist layer 224. That is, the third columnar wiring line 196 and the fifth columnar wiring line 198 are formed. Although not illustrated in the drawings, the first columnar wiring line 194, the second columnar wiring line 195, the fourth columnar wiring line 197, and the sixth columnar wiring line 199 are also formed.

Figure 36:
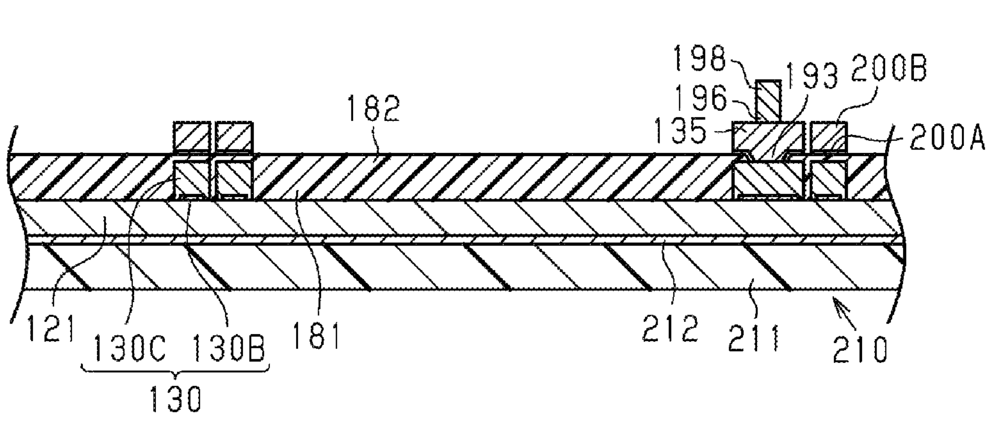
FIG. 36 is an explanatory diagram of the manufacturing method of the inductor component in the second embodiment.

The fourth resist layer removing step and the third resist layer removing step are performed at the same time next to the vertical wiring line processing step. Specifically, the third resist layer 223 and the fourth resist layer 224 are peeled off to remove from the first magnetic layer 121 as illustrated in FIG. 36. Then, the third wiring line layer 200A functioning as a seed layer exposed to the surface is removed by etching.

Figure 37:
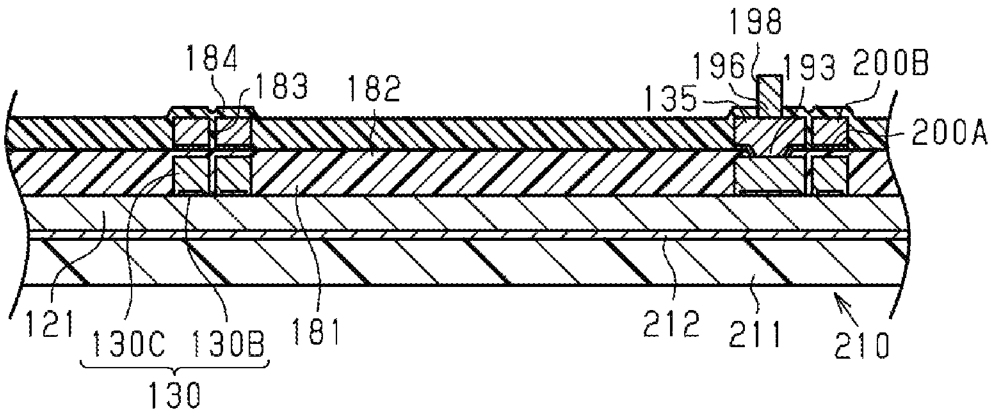
FIG. 37 is an explanatory diagram of the manufacturing method of the inductor component in the second embodiment.
Figure 38:
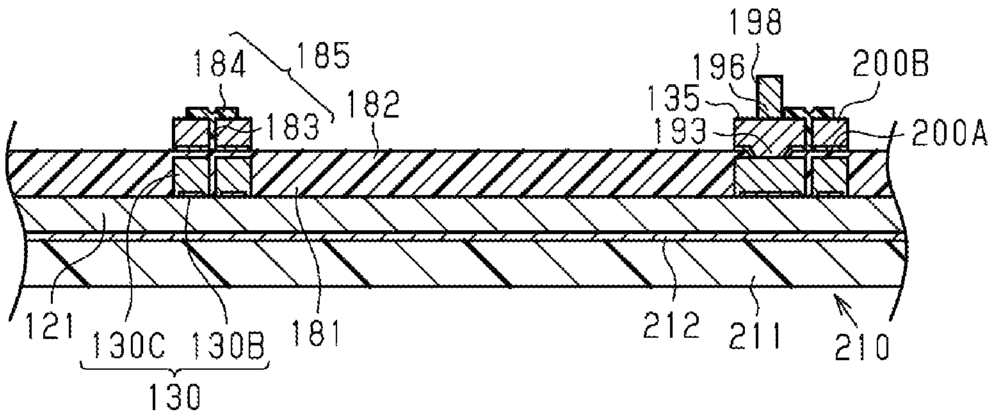
FIG. 38 is an explanatory diagram of the manufacturing method of the inductor component in the second embodiment.
Figure 39:
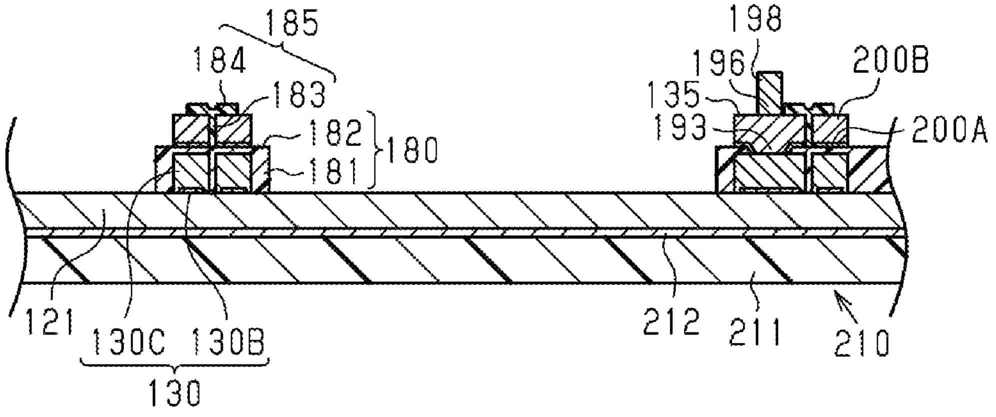
FIG. 39 is an explanatory diagram of the manufacturing method of the inductor component in the second embodiment.

The second insulation layer processing step is performed next to the third resist layer removing step. In the second insulation layer processing step, an insulation resin is applied to the upper side face as illustrated in FIG. 37. Specifically, first, the insulation resin is applied from the upper side in the lamination direction to an extent in which the fourth wiring line layer 200B is entirely covered. Next, the portion for forming the fourth insulation portion 184 is exposed to light. Thereafter, the uncured portion of the applied insulation resin is peeled and removed by a chemical solution. As a result, the portion of the applied insulation resin exposed to light is cured, and the third insulation portion 183 and the fourth insulation portion 184 are formed as illustrated in FIG. 38. Thereafter, in the first insulation layer including the first insulation portion 181 and the second insulation portion 182, the portion in which the first insulation portion 181 and the second insulation portion 182 are not formed, is removed by laser as illustrated in FIG. 39.

Figure 40:
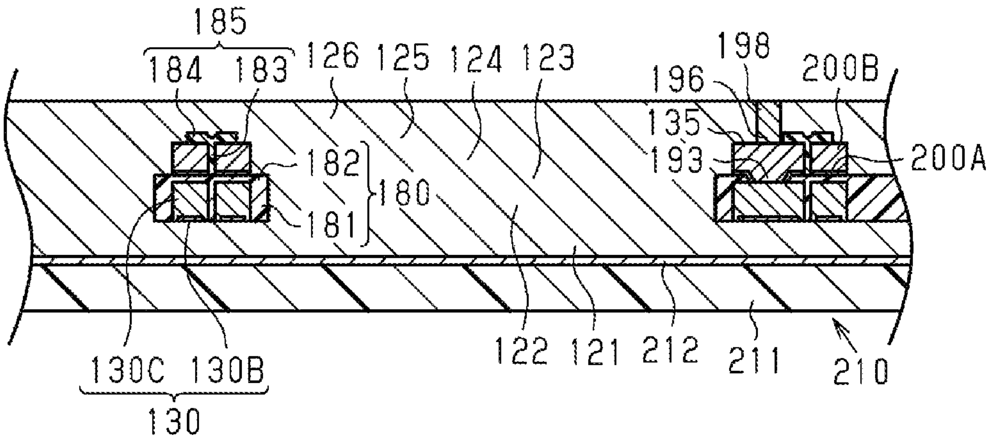
FIG. 40 is an explanatory diagram of the manufacturing method of the inductor component in the second embodiment.

The second magnetic layer processing step is performed next to the second insulation layer processing step. In the second magnetic layer processing step, a magnetic material is filled to the upper side in the lamination direction relative to the upper end of the fifth columnar wiring line 198 as illustrated in FIG. 40. Next, the grinding from the upper side in the lamination direction is performed until upper ends of the respective vertical wiring lines are exposed. With this, the second magnetic layer 122, the third magnetic layer 123, the fourth magnetic layer 124, the fifth magnetic layer 125, and the sixth magnetic layer 126 are formed.

Figure 41:
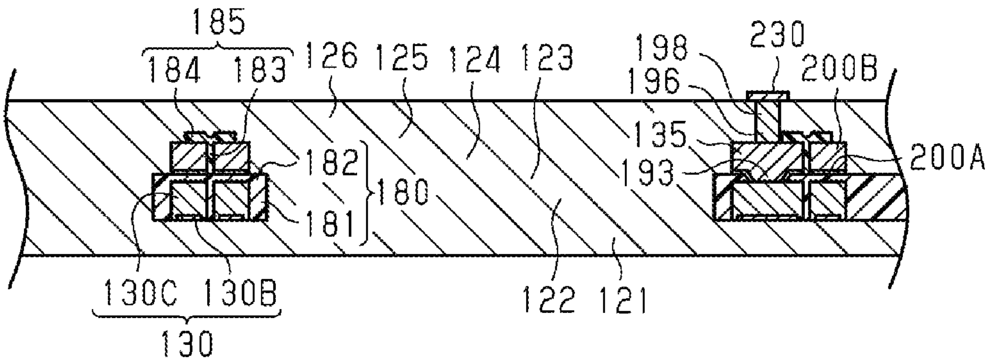
FIG. 41 is an explanatory diagram of the manufacturing method of the inductor component in the second embodiment.

The base substrate removing step is performed next to the second magnetic layer processing step. In the base substrate removing step, the base substrate with the copper foil 210 is removed as illustrated in FIG. 41. Specifically, the base substrate 211 is peeled off to remove from the first magnetic layer 121. Next, the copper foil is removed by etching. Then, the first magnetic layer 121 is ground from the lower side in the lamination direction until the thickness from the lower end of the first magnetic layer 121 toward the upper end of the sixth magnetic layer 126 reaches a desired value.

The outer electrode processing step is performed next to the base substrate removing step. Specifically, the outer electrode is formed on the upper side faces of the respective vertical wiring lines, that is, the upper side faces of the fourth columnar wiring line 197, the fifth columnar wiring line 198, and the sixth columnar wiring line 199 by electroless plating, electrolytic plating, printing, sputtering, or the like. The outer electrode has a single-layer or a laminated structure and includes any of copper, nickel, gold, and tin.

Figure 42:
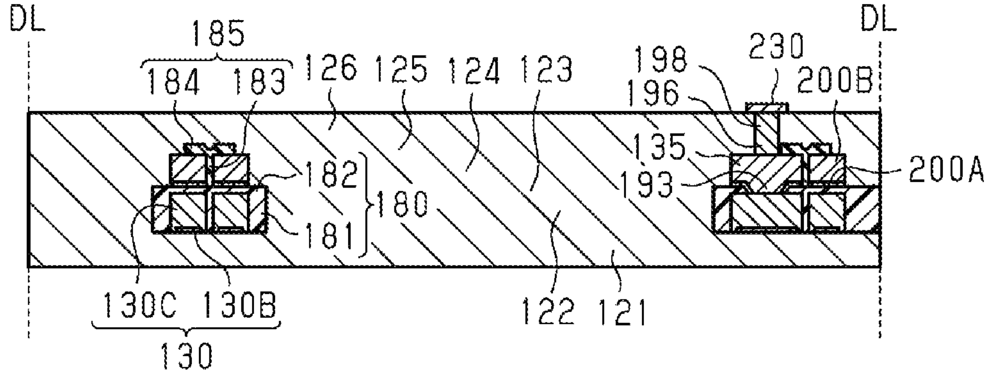
FIG. 42 is an explanatory diagram of the manufacturing method of the inductor component in the second embodiment.

The dividing step is performed next to the outer electrode processing step. Specifically, the dividing is performed by cutting with a dicing machine at break lines DL as illustrated in FIG. 42. With this, the inductor component 110 may be obtained. In addition, at this time, the first dummy wiring line 141 and the second dummy wiring line 142 included in the break lines DL are exposed to the side face of the inductor component 110.

Next, effects of the second embodiment will be described. According to the second embodiment, in addition to the effects of (1) to (5) and (9) to (13) of the first embodiment, the following effects are achieved.

(14) According to the inductor component 110 in the second embodiment, part of the second wiring line layer 130C extends to the layer in which the first wiring line layer 130B is disposed, and is interposed between the first wiring line layer 130B and the second magnetic layer 122. Therefore, the contact area between the first wiring line layer 130B and the second wiring line layer 130C is increased, and the adhesion between the first wiring line layer 130B and the second wiring line layer 130C is improved.

(15) According to the inductor component 110 in the second embodiment, the entire fourth wiring line layer 200B is laminated on the upper side face of the third wiring line layer 200A, and is not interposed between the third wiring line layer 200A and the fourth magnetic layer 124. Therefore, different resist designs are allowed to manufacture the first inductor wiring line 130 and the second inductor wiring line 135, and it improves the degree of freedom in design.

(16) According to the inductor component 110 in the second embodiment, the first inductor wiring line 130 and the second inductor wiring line 135 are disposed in the lamination direction. That is, the inductor wiring line is not constituted as a single layer, but is constituted as a plurality of layers. Therefore, the inductance of the entire inductor component 110 may be improved.

(17) According to the inductor component 110 in the second embodiment, the first insulation layer 180 contains insulation resin and an inorganic filler. Therefore, strength of the first insulation layer 180 may be improved.

(18) According to the inductor component 110 in the second embodiment, the material of the first wiring line layer 130B has a copper ratio equal to or less than about 99 wt % and a nickel ratio equal to or larger than about 0.1 wt %. Therefore, the first wiring line layer 130B may be manufactured by electroless plating. Further, the third wiring line layer 200A contains chromium or titanium. Therefore, the third wiring line layer 200A may be manufactured by sputtering. As a result, the wiring line layers disposed in different layers may be manufactured by different manufacturing methods, which improves the degree of freedom in the manufacturing process.

Each of the embodiments may be implemented with the following modifications. Each of the embodiments and the following modifications can be implemented in combination within a scope not technically contradicting each other.

In each of the embodiments, the inductor wiring line is capable of imparting inductance to the inductor component by generating magnetic flux in the magnetic layer when an electric current flows.

In each of the embodiments, the shape of the inductor wiring line is not limited to the example in each embodiment. For example, the inductor wiring line may have a curved shape less than about 1.0 turn or a linear shape of 0 turns. Further, part of a plurality of inductor wiring lines may have a shape different from that of other inductor wiring line. Furthermore, in each of the embodiments, the inductor wiring line may have a meander shape.

In the first embodiment, a plurality of the inductor wiring lines 30 may be provided in the same layer. In this case, the provision of the plurality of inductor wiring lines 30 may suppress an excessive increase in the overall size in the lamination direction because the plurality of inductor wiring lines 30 is disposed in the same layer while an overall inductance is improved. Further, the inductor component 10 in which the plurality of inductor wiring lines 30 is provided in the same layer may be used by being divided into a plurality of inductor components.

In each of the embodiments, the wiring line structure of the inductor wiring line is not limited to the example in each embodiment. For example, in the inductor wiring line, the shapes of the first pad and the second pad may be changed, or the first pad and the second pad may be omitted.

In the first embodiment, the catalyst layer 30A and the second wiring line layer 30C may be omitted in the inductor wiring line 30, and the inductor wiring line 30 may be constituted of only the first wiring line layer 30B. Even in this case, the lower side face of the first wiring line layer 30B constitutes the main face MF of the inductor wiring line 30 and the anchor portion 34 needs to extend from the lower side face of the first wiring line layer 30B.

In each of the embodiments, the amount that the anchor portion covers is not limited to the example in each embodiment. For example, the anchor portion may not cover all of the surface of the magnetic metal powder in contact with, and may cover less than about one-third of the area thereof. In this case, the magnetic metal powder covered by the anchor portion may not include a cross section in which equal to or more than about one-third of the surface is covered by the anchor portion when the magnetic metal powder is viewed in a cross section. Further, the anchor portion may not cover the surfaces of all the magnetic metal powders in contact with the main face of the inductor wiring line. Furthermore, the anchor portion may be omitted.

In each of the embodiments, the formation of the anchor portion and the control of the amount to be covered by the anchor portion are not limited to the example in the embodiment. For example, in the first embodiment, an alkaline chemical solution that dissolves the base material 20A of the first magnetic layer 21 and does not dissolve the magnetic metal powder 20B is used at the time of surface treatment such as removing the resin residue of the first magnetic layer 21, and the interface state between the base material 20A and the magnetic metal powder 20B may be controlled with the duration of the processing time.

In the first embodiment, a slight gap is formed between the base material 20A and the magnetic metal powder 20B when the grinding is performed and an electroless copper plating solution is infused into the gap in the inductor wiring line processing step. However, any other known method may be used as long as the anchor portion 34 may be formed. In particular, even in a case where there is no clear gap at the interface between the base material 20A and the magnetic metal powder 20B, the electroless copper plating solution enters along the interface between the base material 20A and the magnetic metal powder 20B, and the substitution of iron with copper described above is generated. Therefore, a gap between the base material 20A and the magnetic metal powder 20B need not be formed at the time of the grinding.

In the first embodiment, the catalyst layer 30A and the second wiring line layer 30C may be omitted in the inductor wiring line 30, and the inductor wiring line 30 may be constituted of only the first wiring line layer 30B.

In each of the embodiments, the material of the first wiring line layer is not limited to the example in each embodiment. For example, the material of the first wiring line layer may have a nickel ratio equal to or less than about 99 wt % and a phosphorus ratio equal to or larger than about 0.5 wt % and equal to or less than about 10 wt % (i.e., from about 0.5 wt % to about 10 wt %). In this case, containing phosphorus allows the control of the stress existing in nickel, and the residual stress in the inductor component may be mitigated. Further, containing nickel in the first wiring line layer may suppress electromigration.

In each of the embodiments, the material of the second wiring line layer may be a metal other than copper. Note that the boundary face between the second wiring line layer and the first wiring line layer is not necessarily clear, and in some cases, a clear interface between the first wiring line layer and the second wiring line layer may not be observed.

In each of the embodiments, the thickness of the second wiring line layer may be less than about five times the thickness of the first wiring line layer.

In the first embodiment, the material of the catalyst layer 30A is not limited to the example in the embodiment. The material of the catalyst layer 30A needs to include at least one or more metals among palladium, platinum, silver, and gold.

In the first embodiment, the thickness TA of the inductor wiring line 30 is not limited to the example in the embodiment. When the thickness TA of the inductor wiring line 30 is equal to or larger than about 40 μm, the DC resistance may be made relatively small. When the thickness TA of the inductor wiring line 30 is equal to or less than about 120 μm, the wiring line width with respect to the thickness TA may not excessively be increased.

In the first embodiment, the thickness TB of the first wiring line layer 30B is not limited to the example in the embodiment. When the thickness TB of the first wiring line layer 30B is equal to or larger than about 0.3 μm and equal to or less than about 10 μm (i.e., from about 0.3 μm to about 10 μm), the first wiring line layer 30B may easily be formed by electroless copper plating.

In each of the embodiments, the material of the insulation layer is not limited to the example in each embodiment. For example, when the material of the insulation layer contains at least one resin among epoxy-based resin, phenol-based resin, acrylic-based resin, polyimide-based resin, and liquid crystal polymer-based resin, and an inorganic filler having an average particle size equal to or less than about 1 m, it is suitable for ensuring the strength of the magnetic layer. Further, the material of the insulation layer is not limited to the above-description, and may be only a resin with an insulation property.

In each of the embodiments, the area in which the insulation layer covers the inductor wiring line is not limited to the example in each embodiment. It is sufficient that at least the face of the surface of the inductor wiring line on the first magnetic layer side is not covered by the insulation layer and in contact with the first magnetic layer, and the face of the surface of the inductor wiring line on the second magnetic layer side is covered by the insulation layer. For example, in the first embodiment, all the face of the inductor wiring line 30 on the second magnetic layer 22 side may be covered by the insulation layer 80. Further, all of the face of the inductor wiring line 30 on the third magnetic layer 23 side may be covered by the insulation layer 80. Furthermore, the face of the inductor wiring line 30 on the third magnetic layer 23 side may not be covered by the insulation layer 80. Still further, when part of the face of the inductor wiring line 30 on the second magnetic layer 22 side is covered by the insulation layer 80, the insulation layer 80 may not be interposed at the portion where the distance between the wiring lines in the inductor wiring line 30 is minimum.

In the second embodiment, the materials of the first inductor wiring line 130 and the second inductor wiring line 135 may be the same with each other.

In the second embodiment, the fourth wiring line layer 200B in the second inductor wiring line 135 may not extend to the layer in which the third wiring line layer 200A is disposed, and may not be interposed between the third wiring line layer 200A and the fifth magnetic layer 125.

In the manufacturing method in each of the embodiments, the dividing step may be omitted. In this case, for example, when the inductor component is manufactured in the size of one component from the first magnetic layer processing step, the dividing step may be omitted.

In the embodiments, the boundaries of the magnetic layers in the respective layers may be integrated such that the interfaces cannot be confirmed, or may be separate bodies in which the interfaces can be confirmed.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component, comprising:

a first magnetic layer;

an inductor wiring line laminated on a main face of the first magnetic layer;

a second magnetic layer disposed in a layer same as the inductor wiring line;

a third magnetic layer disposed on a main face of the inductor wiring line and the second magnetic layer on a side opposite to the first magnetic layer; and an insulation layer being a non-magnetic material in contact with part of a surface of the inductor wiring line, wherein, an entire face of the surface of the inductor wiring line on the main face of the first magnetic layer is in physical contact with the first magnetic layer, and a face of the surface of the inductor wiring line on a side of the second magnetic layer is in contact with the insulation layer.

2. The inductor component according to claim 1, wherein a face of the surface of the inductor wiring line on a side of the third magnetic layer is in contact with the insulation layer.

3. The inductor component according to claim 1, wherein part of the surface of the inductor wiring line is exposed from the insulation layer and is in contact with the second magnetic layer.

4. The inductor component according to claim 1, wherein the inductor wiring line is wound more than 1.0 turns in the layer in which the inductor wiring line is disposed.

5. The inductor component according to claim 4, wherein the insulation layer is interposed in a portion where a distance between wiring lines in the inductor wiring line is minimum in the layer in which the inductor wiring line is disposed.

6. The inductor component according to claim 1, further comprising:

a vertical wiring line being connected to the inductor wiring line and penetrating through the third magnetic layer from a main face on a side of the inductor wiring line toward a main face on a side opposite to a side of the inductor wiring line, wherein a face of a surface of the vertical wiring line on a side of the third magnetic layer is in contact with the insulation layer.

7. The inductor component according to claim 1, wherein the insulation layer includes at least one resin among epoxy-based resin, phenol-based resin, acrylic-based resin, polyimide-based resin, or liquid crystal polymer-based resin.

8. The inductor component according to claim 1, wherein the insulation layer contains an inorganic filler having an average particle size equal to or less than 1.0 μm.

9. The inductor component according to claim 1, wherein the inductor wiring line has a laminated structure including a first wiring line layer on the main face of the first magnetic layer and a second wiring line layer laminated on a surface of the first wiring line layer on a side of the third magnetic layer, and part of the second wiring line layer extends to an inside of a layer in which the first wiring line layer is disposed, and is interposed between the first wiring line layer and the second magnetic layer.

10. The inductor component according to claim 9, wherein the inductor wiring line includes a catalyst layer containing at least one or more metals among palladium, platinum, silver, or gold, and the catalyst layer is disposed on the first wiring line layer on the main face of the first magnetic layer.

11. The inductor component according to claim 9, wherein a material of the first wiring line layer has a copper ratio equal to or less than 99 wt %, and a nickel ratio equal to or larger than 0.1 wt %.

12. The inductor component according to claim 9, wherein a material of the first wiring line layer has a nickel ratio equal to or less than 99 wt %, and a phosphorus ratio from 0.5 wt % to 10 wt %.

13. The inductor component according to claim 9, wherein the inductor wiring line has a thickness from 40 μm to 120 μm, and the first wiring line layer has a thickness from 0.3 μm to 10 μm.

14. The inductor component according to claim 1, further comprising:

a vertical wiring line being connected to the inductor wiring line and penetrating through the third magnetic layer from a main face on a side of the inductor wiring line toward a main face on a side opposite to a side of the inductor wiring line, wherein a covering layer formed of an insulation material is laminated on the main face of the third magnetic layer on a side opposite to the inductor wiring line, a face of the vertical wiring line on a side opposite to the inductor wiring line is not covered by the covering layer, and an outer electrode is connected to a portion in the vertical wiring line being exposed from the covering layer.

15. The inductor component according to claim 1, wherein when the inductor wiring line is denoted as a first inductor wiring line and the insulation layer is denoted as a first insulation layer, the inductor component further comprises:

a second inductor wiring line disposed on a main face of the third magnetic layer on a side opposite to the first inductor wiring line;

a fourth magnetic layer disposed in a layer same as the second inductor wiring line;

a fifth magnetic layer disposed on the second inductor wiring line and the fourth magnetic layer on a side opposite to the first inductor wiring line; and a second insulation layer being a non-magnetic material in contact with part of a surface of the second inductor wiring line, wherein a face of the first inductor wiring line on a side of the third magnetic layer is in contact with the first insulation layer, a face of a surface of the second inductor wiring line on a side of the first inductor wiring line is in contact with the first insulation layer, and a face of the surface of the second inductor wiring line on a side of the fourth magnetic layer is in contact with the second insulation layer.

16. The inductor component according to claim 15, wherein the first insulation layer contains an inorganic filler, and the second insulation layer does not contain the inorganic filler.

17. The inductor component according to claim 16, wherein the first inductor wiring line has a laminated structure including a first wiring line layer and a second wiring line layer laminated on a surface of the first wiring line layer on a side opposite to the first magnetic layer, the second inductor wiring line has a laminated structure including a third wiring line layer and a fourth wiring line layer laminated on a surface of the third wiring line layer on a side opposite to the third magnetic layer, a material of the first wiring line layer has a copper ratio equal to or less than 99 wt %, and a nickel ratio equal to or larger than 0.1 wt %, and a material of the third wiring line layer includes at least one of chromium or titanium.

18. The inductor component according to claim 16, wherein the first inductor wiring line has a laminated structure including a first wiring line layer and a second wiring line layer laminated on a surface of the first wiring line layer on a side opposite to the first magnetic layer, the second inductor wiring line has a laminated structure including a third wiring line layer and a fourth wiring line layer laminated on a surface of the third wiring line layer on a side opposite to the third magnetic layer, part of the second wiring line layer extends to an inside of a layer in which the first wiring line layer is disposed, and is interposed between the first wiring line layer and the second magnetic layer, and the fourth wiring line layer is entirely laminated on a surface of the third wiring line layer on a side opposite to the third magnetic layer.

19. The inductor component according to claim 1, wherein the entire face of the surface of the inductor wiring line on the main face of the first magnetic layer is in direct contact with the first magnetic layer.

20. The inductor component according to claim 1, wherein a cross-section of the insulation layer formed in a shape of the letter T.

21. The inductor component according to claim 1, wherein an insulation layer being a non-magnetic material in contact with part of a surface of the inductor wiring line, the insulation layer extending for less than one turn between adjacent turns of the inductor wiring line.

22. An inductor component, comprising:

a first magnetic layer;

an inductor wiring line laminated on a main face of the first magnetic layer;

a second magnetic layer disposed in a layer same as the inductor wiring line;

a third magnetic layer disposed on a main face of the inductor wiring line and the second magnetic layer on a side opposite to the first magnetic layer; and an insulation layer being a non-magnetic material in contact with part of a surface of the inductor wiring line, wherein, an entire face of the surface of the inductor wiring line on the main face of the first magnetic layer is in contact with the first magnetic layer, a face of the surface of the inductor wiring line on a side of the second magnetic layer is in contact with the insulation layer, and a portion of the insulation layer is positioned directly between the inductor wiring line and the third magnetic layer.

* * * * *